United States Patent
Nishio et al.

(10) Patent No.: US 8,929,300 B2
(45) Date of Patent: Jan. 6, 2015

(54) RADIO COMMUNICATION BASE STATION DEVICE AND CONTROL CHANNEL ARRANGING METHOD

(75) Inventors: Akihiko Nishio, Kanagawa (JP); Masaru Fukuoka, Ishikawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 1128 days.

(21) Appl. No.: 12/377,579

(22) PCT Filed: Aug. 17, 2007

(86) PCT No.: PCT/JP2007/066018
§ 371 (c)(1),
(2), (4) Date: Feb. 13, 2009

(87) PCT Pub. No.: WO2008/020623
PCT Pub. Date: Feb. 21, 2008

(65) Prior Publication Data
US 2010/0226318 A1    Sep. 9, 2010

(30) Foreign Application Priority Data

Aug. 18, 2006 (JP) .................. 2006-223583
Apr. 11, 2007 (JP) .................. 2007-104209

(51) Int. Cl.
*H04W 72/04* (2009.01)
*H04B 7/12* (2006.01)
*H04W 52/32* (2009.01)
*H04B 7/04* (2006.01)
*H04W 88/08* (2009.01)

(52) U.S. Cl.
CPC .............. *H04B 7/12* (2013.01); *H04W 72/0493* (2013.01); *H04W 88/08* (2013.01); *H04W 52/325* (2013.01); *H04B 7/0452* (2013.01)

USPC ............ 370/329; 370/204; 370/208; 370/210

(58) Field of Classification Search
CPC .................. H04B 72/0493; H04W 52/325
USPC .................... 370/204, 208, 210, 310
See application file for complete search history.

(56) References Cited

U.S. PATENT DOCUMENTS

2005/0265292 A1* 12/2005 Atsuta .......................... 370/335
2006/0262871 A1* 11/2006 Cho et al. ...................... 375/260

(Continued)

FOREIGN PATENT DOCUMENTS

WO     2006/043588     4/2006

OTHER PUBLICATIONS

3GPP TSG RAN WG1 LTE Ad Hoc on LTE, R1-050604, Sophia ANtipolis, France, Jun. 20-21, 2005, Agenda Item: 4.1, Source: Samsung, Title: "Downlink Channelization and Multiplexing for EUTRA," Document for: Discussion & Decision, pp. 1-9.*

(Continued)

*Primary Examiner* — Un C Cho
*Assistant Examiner* — Siming Liu
(74) *Attorney, Agent, or Firm* — Dickinson Wright PLLC

(57) ABSTRACT

Provided is a base station which can prevent deterioration of data channel application control accuracy due to influence of transmission power control to a control channel. In the base station, each encoding section (11) performs encoding processing to an SCCH (Shared Control Channel) of each mobile station, each modulating section (12) performs modulation processing to the encoded SCCH, an arranging section (102) arranges the SCCH to each mobile station to one of a plurality of subcarriers which configure an OFDM symbol, and transmission power control section (103) controls transmission power of the SCCH based on reception quality information reported from each mobile station. The arranging section (102) arranges a plurality of the SCCH to be under transmission power control to one of the subcarriers so that combinations at resource blocks are the same.

12 Claims, 20 Drawing Sheets

(56) References Cited

U.S. PATENT DOCUMENTS

2007/0047483 A1* 3/2007 Khan .......................... 370/328
2009/0245197 A1* 10/2009 Ma et al. ...................... 370/330
2012/0230292 A1 9/2012 Nanba

OTHER PUBLICATIONS

International Search Report dated Nov. 20, 2007.
3GPP TSG RAN WG1 LTE Ad Hoc, R1-061672, Jun. 30, 2006, NTT DoCoMo, et al., "Coding Scheme of L1/L2 Control Channel for E-UTRA Downlink," pp. 1-19.
N. Miki, et al., "Evolved UTRA Kudari Link ni Okeru L1/L2 Seigyo Channel no Kosei no Kento," 2006 Nen IEICE Communications Society Conference Koen Ronbunshu 1, The Institute of Electronics, Information and Communication Engineers, Sep. 6, 2006, p. 394.
3GPP TSG RAN WG1 LTE Ad Hoc, R1-061673, Jun. 30, 2006, NTT DoCoMo, et al., "Multiplexing Method of Downlink L1/L2 Control Channel," pp. 1-6.
3GPP TSG RAN WG1 Ad Hoc on LTE R1-050604, Sophia Antipolis, France, Jun. 20-21, 2005, Agenda Item: 4.1, Source: Samsung, Title: "Downlink Channelization and Multiplexing for EUTRA," Document for: Discussion & Decision, pp. 1-9.

* cited by examiner

RADIO COMMUNICATION BASE STATION DEVICE AND CONTROL CHANNEL ARRANGING METHOD

TECHNICAL FIELD

The present invention relates to a radio communication base station apparatus and a control channel allocation method.

BACKGROUND ART

In recent years, in the field of radio communication, especially in mobile communication, a variety of information such as images and data in addition to speech is transmitted. The demand for higher-speed transmission is expected to further increase in the future, and, to perform high-speed transmission, a radio transmission techniques that utilizes limited frequency resources more effectively and achieves high transmission efficiency is in demand.

OFDM (Orthogonal Frequency Division Multiplexing) is one of radio transmission techniques, for meeting these demands. OFDM is one of multicarrier communication techniques, whereby data is transmitted in parallel using a large number of subcarriers, and it is known that OFDM has features providing high frequency efficiency and reducing inter-symbol interference under a multipath environment and is effective to improve transmission efficiency.

Studies are being conducted for performing frequency scheduling transmission and frequency diversity transmission using this OFDM on the downlink, when data for a plurality of radio communication mobile station apparatuses (hereinafter simply "mobile stations") is frequency-domain-multiplexed on a plurality of subcarriers (see Non-Patent Document 1, for example).

In frequency scheduling transmission, a radio communication base station apparatus (hereinafter simply "base station") adaptively allocates subcarriers for mobile stations, based on the received quality of each frequency band in each mobile station, so that it is possible to obtain a maximum multi-user diversity effect. On the other hand, frequency scheduling is normally performed for each subband, which groups a certain number of neighboring subcarriers into a block, and therefore, not much frequency diversity effect is obtained.

In Non-Patent Document 1, the channel for performing frequency scheduling transmission is referred to as a "localized channel (hereinafter, the "Lch"). The Lch is allocated in subband units or in units of a plurality of consecutive subcarriers. Further, the Lch may be referred to as a "localized resource block (hereinafter, the "L-RB")."

Non-Patent Document 1 shows an example of dividing one frame (ten milliseconds) into twenty subframes (one subframe=0.5 milliseconds) and including six or seven OFDM symbols in one subframe.

By contrast with this, in frequency diversity transmission, data for mobile stations is allocated to the subcarriers in a distributed manner over the entire band, so that a high frequency diversity effect can be obtained. On the other hand, frequency diversity transmission is performed regardless of received quality for each mobile station, and therefore multi-user diversity effect such as in the frequency scheduling transmission cannot be obtained. In Non-patent Document 1, the channel for performing frequency diversity transmission is referred to as a "distributed channel (hereinafter, the "Dch"). Further, the Dch may be referred to as a "distributed resource block (hereinafter, the "D-RB")."

Adaptive control including adaptive modulation may be performed for the Lchs and the Dchs on a per subframe basis. For example, to achieve the required error rate, based on received quality information fed back from a mobile station, the base station performs adaptive control for the modulation scheme and coding rate (Modulation and Coding scheme: MCS) of L-ch data and D-ch data.

Upon performing adaptive control, the base station transmits control information on a per subframe basis to the mobile station which is a transmission destination of data in each subframe. Normally, control information is transmitted in SCCHs (Shared Control Channels). Further, control information includes the mobile station ID, RB (Resource Block) numbers, MCS information, and so on. The number of SCCHs in one subframe is the same as the number of mobile stations data is transmitted to in the subframe. Further, control information in an SCCH is transmitted at the beginning of each subframe prior to data transmission. Moreover, transmission power control for an SCCH is carried out on a per mobile station basis. That is, the SCCH for a mobile station located near a cell boundary is controlled to high transmission power, and the SCCH for a mobile station located near a center part of a cell is controlled to low transmission power. By this means, limited power resources are flexibly adjusted between the mobile stations and used effectively.

Non-patent Document 1: R1-050604 "Downlink Channelization and Multiplexing for EUTRA" 3GPP TSG RAN WG1 Ad Hoc on LTE, Sophia Antipolis, France, 20-21 Jun. 2005

DISCLOSURE OF INVENTION

Problems to be Solved by the Invention

When frequency scheduling transmission and frequency diversity transmission are performed, the mobile stations transmitted data from the base station vary on a per subframe basis, and therefore the transmission power for the SCCHs of mobile stations vary on a per subframe basis. Further, in an inter-base station non-synchronization system, where transmission timings are different between base stations, the SCCHs interfere with data channels in neighboring cells. That is, if transmission power for the SCCH varies per subframe, interference that the data channels receives from the SCCH also varies on a per subframe basis.

Here, frequency scheduling and adaptive control for data channels are performed based on received quality measured in the past subframes, and so, if interference that data channels receive from the SCCHs varies every subframe and changes the received quality of data channels on a per subframe basis, adaptive control using current and accurate received quality information cannot be performed upon data transmission. That is, the accuracy of adaptive control is degraded. As a result, data throughput decreases.

It is therefore an object of the present invention to provide a base station and control channel allocation method for preventing the accuracy of adaptive control from degrading.

Means for Solving the Problem

The base station of the present invention adopts a configuration including: an allocating section that allocates a plurality of control channels to a plurality of subcarriers such that a combination of the plurality of control channels is the same between a plurality of resource blocks; a generating section that generates a multicarrier signal in which the plurality of control channels are allocated to the plurality of subcarriers; and a transmitting section that transmits the multicarrier signal.

Advantageous Effect of the Invention

According to the present invention, it is possible to prevent degradation of the accuracy of adaptive control.

BEST MODE FOR CARRYING OUT THE INVENTION

Now, embodiments of the present invention will be described in detail with reference to the accompanying drawings.

Figure 1:
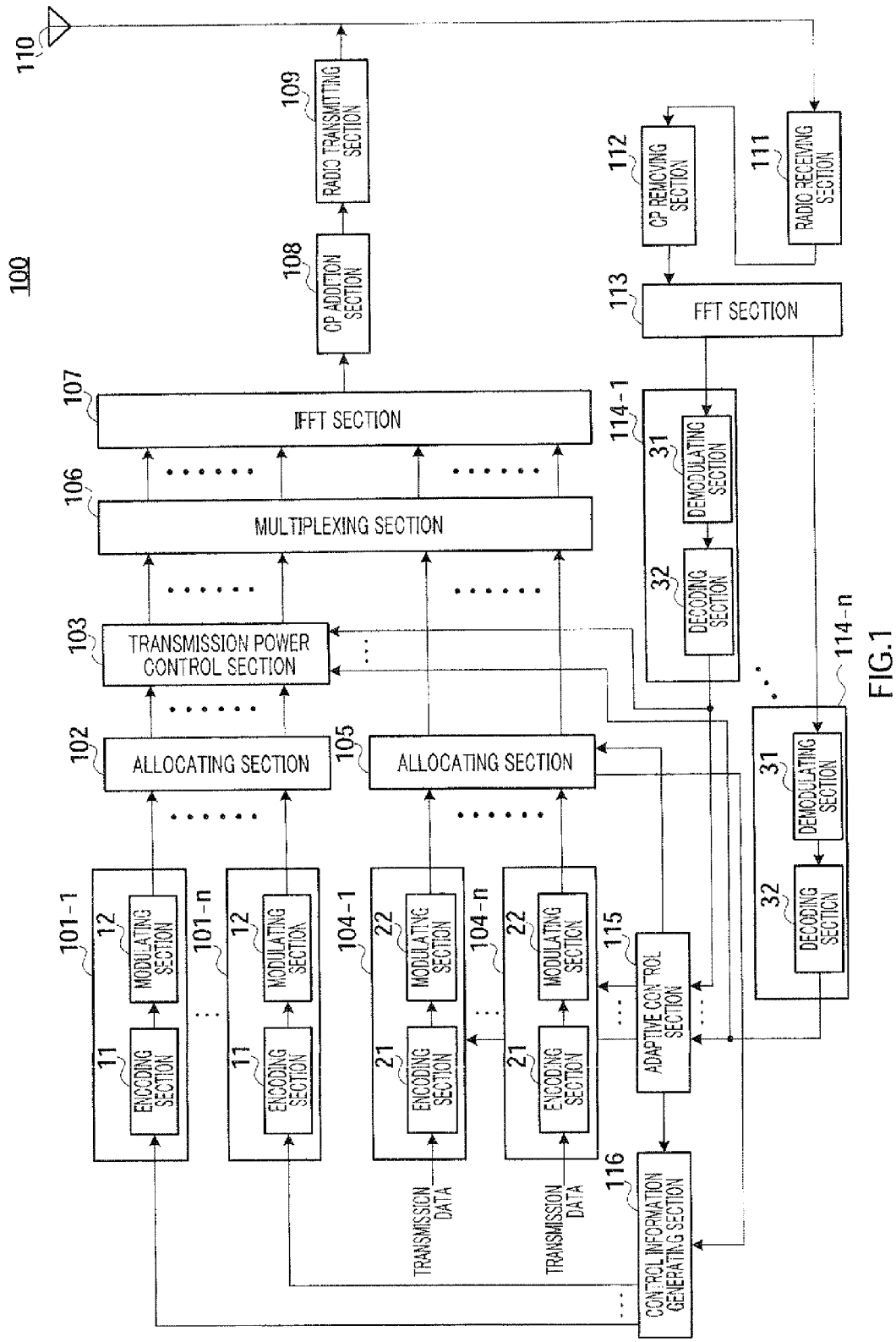
FIG. 1 is a block diagram showing the configuration of the base station according to an embodiment of the present invention.

FIG. 1 shows the configuration of base station 100 of the present embodiment. Base station 100 is used in a mobile communication system where adaptive control for data channels is performed every several RBs (resource blocks).

In base station 100, encoding and modulating sections 101-1 to 101-n each formed with encoding section 11 and modulating section 12 for an SCCH, encoding and modulating sections 104-1 to 104-n each formed with encoding section 21 and modulating section 22 for a data channel, and demodulating and decoding sections 114-1 to 114-n each formed with demodulating section 31 and decoding section 32, are provided in the number of mobile stations n with which base station 100 can communicate. Further, encoding and modulating sections 101-1 to 101 n, encoding and modulating sections 104-1 to 104-n, and demodulating and decoding sections 114-1 to 114-n, are provided for mobile stations 1 to n.

In encoding and modulating sections 101-1 to 101-n, encoding sections 11 encode control information per mobile station transmitted in the SCCHs per mobile station, and modulating sections 12 modulate control information after encoding, and output the control information to allocating section 102.

Allocating section 102 allocates the control information for the mobile stations to a plurality of subcarriers forming an OFDM symbol, and outputs the allocated control information to transmission power control section 103. That is, allocating section 102 allocates the SCCH for each mobile station to one of a plurality of subcarriers forming an OFDM symbol. The allocation process in allocating section 102 will be explained in detail.

Transmission power control section 103 controls transmission power of control information based on received quality information reported from the mobile stations, and outputs the control information to multiplexing section 106. At this time, based on received quality information over the entire band per mobile station, transmission power control section 103 controls control information transmission power on a per SCCH basis. Further, transmission power of the SCCHS for each mobile station is set such that each mobile station can receive control information in sufficient received quality. That is, transmission power control section 103 controls transmission power of a plurality of SCCHs individually.

In encoding and modulating sections 104-1 to 104-n, encoding sections 21 encode transmission data per mobile station and modulating sections 22 modulate the transmission data after encoding, and output the modulated transmission data to allocating section 105. The coding rate and modulation scheme at this time follow MCS information inputted from adaptive control section 115.

According to the control from adaptive control section 115, allocating section 105 allocates data for mobile stations to a plurality of subcarriers forming an OFDM symbol, and outputs the allocated data to multiplexing section 106. At this time, allocating section 105 allocates data for mobile stations to a plurality of subcarriers in L-RB units or in D-RB units. Further, allocating section 105 outputs the mobile station IDs and RB numbers as allocation information for data (information showing which data for which mobile station has been allocated to which RBs) to control information generating section 116.

Multiplexing section 106 time-domain-multiplexes the data inputted from allocating section 105 and the control information inputted from transmission power control section 103, and output time-domain-multiplexed information to IFFT (Inverse Fast Fourier Transform) section 107. Control information is multiplexed, for example, every subframe.

IFFT section 107 performs an IFFT on a plurality of subcarriers where control information and data are allocated, to generate an OFDM symbol, which is a multicarrier signal. That is, IFFT section 107 generates an OFDM symbol where a plurality of SCCHs after transmission power control is allocated to a plurality of subcarriers.

CP (Cyclic Prefix) addition section 108 adds the same signal as the tail part of the OFDM symbol, to the beginning of that OFDM symbol, as a CP.

Radio transmitting section 109 performs transmission processing including D/A conversion, amplification and up-conversion, on the OFDM symbol with a CP, and transmits the OFDM symbol with a CP from antenna 110 to the mobile stations.

On the other hand, radio receiving section 111 receives via antenna 110 maximum n OFDM symbols transmitted at the same time from a maximum of n mobile stations, and performs receiving processing including down-conversion and D/A conversion on these OFDM symbols CP removing section 112 removes the CPs from the OFDM symbols after receiving processing.

FFT (Fast Fourier Transform) section 113 performs an FFT on the OFDM symbols after the CP removal to obtain mobile station-specific signals multiplexed in the frequency domain. Here, the mobile stations transmit signals using different subcarriers or different subbands, and the mobile station-specific signals include received quality information reported from the mobile stations. Each mobile station is able to measure received quality from, for example, the received SNR, received SIR, received SINR, received CINR, received power, interference power, bit error rate, throughput, MCS that achieves a predetermined error rate, and so on. In addition, received quality information may be referred to as "CQI (Channel Quality Indicator)" or "CSI (Channel State Information)," for example.

In demodulating and decoding sections 114-1 to 114-n, demodulating sections 31 modulate the signal after FFT and, decoding sections 32 decode the signal after demodulation, to acquire received data. Received quality information in the received data is inputted to transmission power control section 103 and adaptive control section 115.

Based on the received quality information reported from the mobile stations, adaptive control section 115 performs adaptive control on the transmission data for the mobile stations. That is, based on the received quality, adaptive control section 115 selects the MCS that can achieve the required error rate for encoding and modulating sections 104-1 to 104-n, and outputs the MCS information. This adaptive control is carried out every L-RB and D-RB. That is, adaptive control section 115 performs adaptive control on data channels every several RBs. Further, based on received quality information, adaptive control section 115 determines with respect to allocating section 105, to which the RBs transmission data for the mobile stations is allocated, using scheduling algorithms such as the maximum SIR method and the proportional fairness method. Further, adaptive control section 115 outputs the MCS information per mobile station to control information generating section 116.

Control information generating section 116 generates control information per mobile station formed with the allocation information per mobile station and the MCS information per mobile station, and outputs the generated control information to corresponding encoding sections 11.

Next, the allocation process in allocating sect ion 102 will be described in detail using the following SCCH allocation examples. In all of the following allocation examples, allocating section 102 allocates a plurality of SCCHs subject to transmission power control to a plurality of subcarriers such that the combination of SCCHs is the same between a plurality of RBs. Further, as described above, adaptive control section 115 performs adaptive control for data channels every several RBs. Furthermore, in all of the following allocation examples, control information transmitted in the SCCHs is time-domain-multiplexed at the beginning of a subframe. That is, the SCCH for each mobile station is allocated to one of a plurality of subcarriers of an OFDM symbol at the beginning of a subframe.

Further, in all of the following allocation examples, one subframe is formed with OFDM symbols #1 to #8, the SCCHs are allocated to the subcarriers in OFDM symbol #1, and the data channels are allocated to the subcarriers in OFDM symbols #2 to #8. Furthermore, a plurality of subcarriers forming an OFDM symbol are divided into a plurality of subbands.

SCCH ALLOCATION EXAMPLE 1 (FIG. 2)

The present allocation example is a case where a data channel in each subframe is formed with L-RBs alone. To be more specific, L-RB 1 is formed with subcarriers $f_1$ to $f_3$, L-RB 2 is formed with subcarriers $f_4$ to $f_6$, and L-RB 3 is formed with subcarriers $f_7$ to $f_9$.

Assuming that the number of RBs in the communication band is N_RB and the number of subcarriers forming one SCCH is M, allocation section 102 allocates the SCCHs for mobile stations to subcarriers such that one RB includes M/N_RB SCCHs. This makes it possible to evenly allocate the SCCHs for mobile stations to the RBs. If M does not divide by N_RB, by allocating the SCCHs for mobile stations to the remaining subcarriers in order, it is possible to approximately evenly allocate the SCCHs for mobile stations to RBs.

Figure 2:
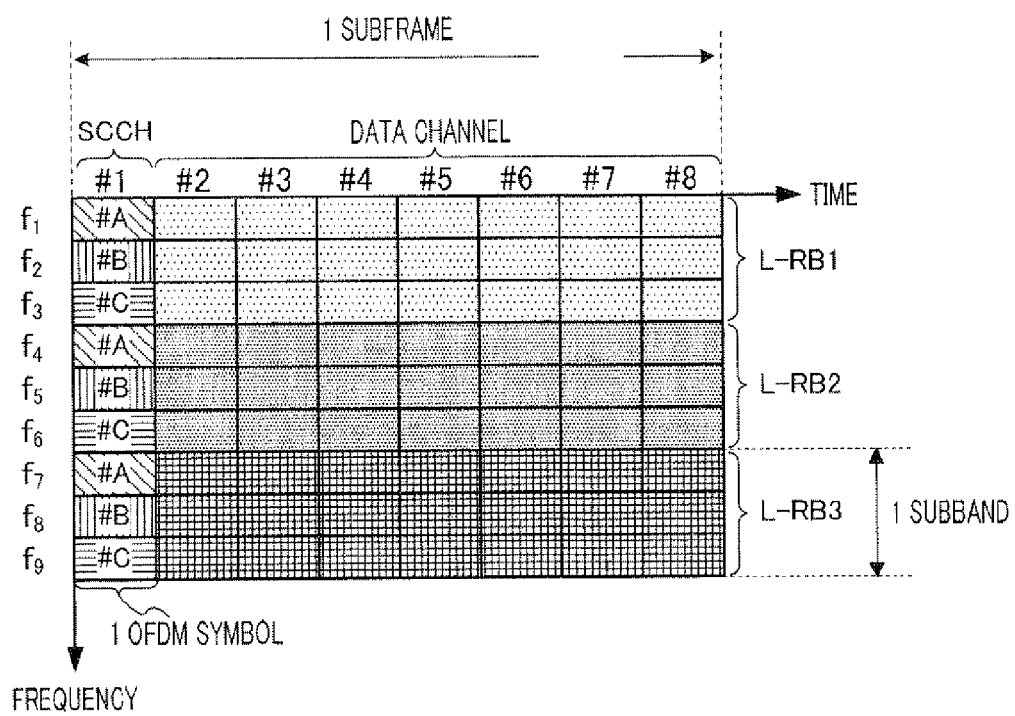
FIG. 2 is SCCH allocation example 1, according to the embodiment of the present invention.

That is, in the RB configuration shown in FIG. 2, allocating section 102 allocates SCCH #A for mobile station #A to subcarriers $f_1$, $f_4$ and $f_7$, SCCH #B for mobile station #B to subcarriers $f_2$, $f_5$ and $f_8$, and SCCH #C for mobile station #C to subcarriers $f_3$, $f_6$ and $f_9$. By this allocation, the combination of a plurality of SCCHs is the same in all of L-RB 1 to L-RB 3, that is, the combination of SCCH #A, SCCH #B and SCCH #C. That is, only if SCCH #A, SCCH #B and SCCH #C have different transmission power by transmission power control, the average transmission power per RB equals between L-RB 1, L-RB 2 and L-RB 3.

In this way, by making the combination of SCCHs the same between all of L-RB 1, L-RB 2 and L-RB 3 and by evenly allocating the SCCHs of mobile stations to RBs, it is possible to minimize the influence of interference fluctuation in which the variation of SCCH transmission power for one mobile station imposes one RB. Further, transmission power of the SCCHs for the mobile stations varies independently per subframe, so that, by an averaging effect, the variation of the total amount of interference that entire SCCHs give the RBs decreases. Particularly, when the mobile stations where data channels are allocated vary between subframes, the amount of variation of SCCH transmission power between subframes increases and an averaging effect further increases. That is, according to the present allocation example, in an inter-base station non-synchronization system, even when interference that data channels receive from SCCHs varies per subframe due to the influence of SCCH transmission power control, it is possible to prevent degradation of accuracy of data channel adaptive control.

Further, transmitting power control section 103 may control the transmission power of SCCH #A, SCCH #B and SCCH #C individually maintaining the total transmission power of SCCH #A, SCCH #B and SCCH #C is fixed. This can fix the interference power the RBs in neighboring cells receive, regardless of individual SCCH transmission power variations. That is, it is possible to prevent degradation of the accuracy of adaptive control in neighboring cells, occurred by influence of the SCCH transmission power control in one cell.

Figure 3:
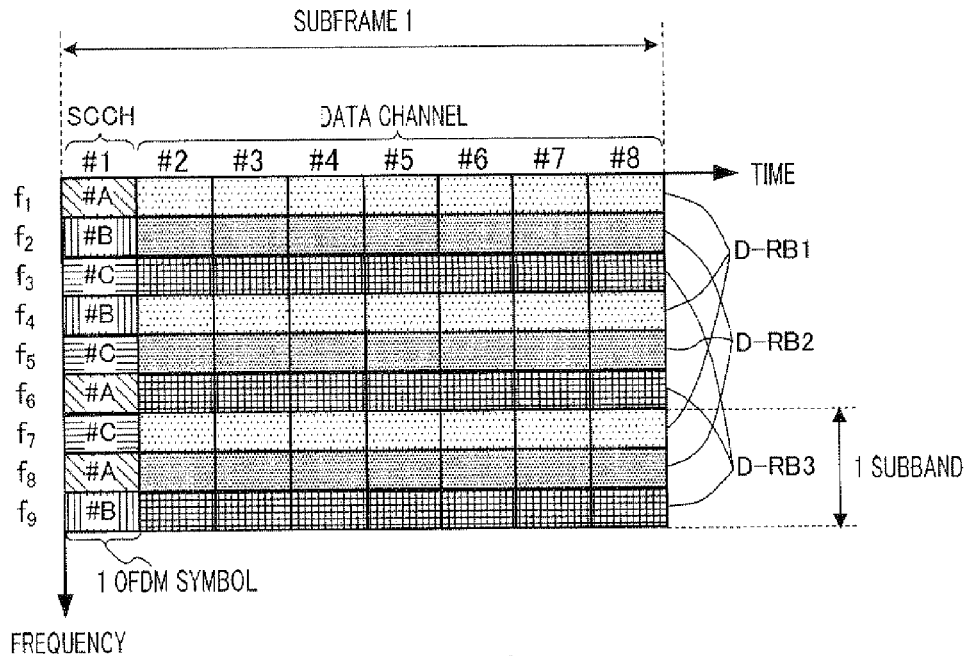
FIG. 3 is SCCH allocation example 2 (subframe 1), according to the embodiment of the present invention.
Figure 4:
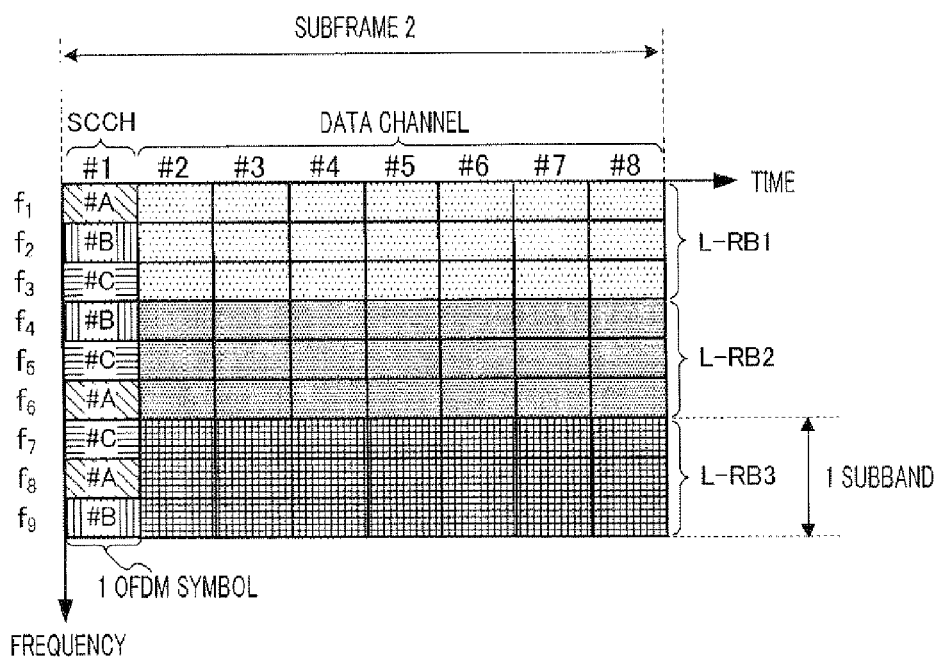
FIG. 4 is SCCH allocation example 2 (subframe 2), according to the embodiment of the present invention.

SCCH ALLOCATION EXAMPLE 2 (FIGS. 3 and 4)

The present allocation example is a case where a data channel in each subframe is formed with D-RBs alone or L-RBs alone, and the D-RBs and L-RBs are time-domain-multiplexed on a per subframe basis. To be more specific, in subframe 1, as shown in FIG. 3, D-RB 1 is formed with subcarriers $f_1$, $f_4$ and $f_7$, D-RB 2 is formed with subcarriers $f_2$, $f_5$ and $f_8$, and D-RB 3 is formed with subcarriers $f_3$, $f_6$ and $f_9$. Further, in subframe 2, as shown in FIG. 4, L-RB 1 is formed with subcarriers $f_1$ to $f_3$, L-RB 2 is formed with subcarriers $f_4$ to $f_6$, and L-RB 3 is formed with subcarriers $f_7$ to $f_9$.

In RB configuration as such, as shown in FIGS. 3 and 4, allocating section 102 allocates SCCH #A for mobile station #A to subcarriers $f_1$, $f_6$ and $f_8$, SCCH #B for mobile station #B to subcarriers $f_2$, $f_4$ and $f_9$, and SCCH #C for mobile station #C to subcarriers $f_3$, $f_5$ and $f_7$. That is, according to the configuration of D-RBs, allocating section 102 cyclically shifts on a per subband basis the allocation pattern of SCCH #A to SCCH #C in each subband, makes the allocation pattern of SCCH #A to SCCH #C different between the subbands, and allocates SCCH #A to SCCH #C to subcarriers $f_1$ to $f_9$.

By adopting such an allocation, even when the SCCH allocation does not change between subframe 1 formed with D-RBs and subframe 2 formed with L-RBs, the combination of a plurality of SCCHs is the same in all of D-RB 1 to D-RB 3 in subframe 1 and L-RB 1 to L-RB 3 in subframe 2, that is, the combination of SCCH #A, SCCH #B and SCCH #C. That even in a case where D-RBs and L-RBs are time-domain-multiplexed on a per subframe basis, it is possible to evenly allocate the SCCHs for mobile stations over a plurality of subframes without changing SCCH allocation. Consequently, even when D-RBs and L-RBs are time-domain-multiplexed on a per subframe basis and interference that data channels receive from the SCCHs varies per subframe due to the influence of SCCH transmission power control, it is possible to prevent degradation of accuracy of data channel adaptive control.

SCCH ALLOCATION EXAMPLE 3 (FIG. 5)

The present allocation example is a case where D-RBs and L-RBs are frequency-domain-multiplexed on a per subframe basis and the number of L-RBs is larger than the number of D-RBs inane subframe. Further, the present allocation example is a case where the number of SCCHs (here, three of SCCH #A, SCCH #B and SCCH #C) is the same as the number of D-RBs in one subband (here, three of D-RB 1, D-RB 2 and D-RB 3).

To be more specific, D-RB 1 is formed with subcarriers $f_1$, $f_{10}$ and $f_{19}$, D-RB 2 is formed with subcarriers $f_2$, $f_{11}$ and $f_{20}$, and D-RB 3 is formed with subcarriers $f_3$, $f_{12}$ and $f_{21}$, and L-RB 1 is formed with subcarriers $f_4$ to $f_6$, L-RB 2 is formed with subcarriers $f_7$ to $f_9$, L-RB 3 is formed with subcarriers $f_{13}$ to $f_{15}$, L-RB 4 is formed with subcarriers $f_{16}$ to $f_{18}$, L-RB 5 is formed with subcarriers $f_{22}$ to $f_{24}$, and L-RB 6 is formed with subcarriers $f_{25}$ to $f_{27}$.

In RB configuration as such, allocating section 102 allocates SCCH #A for mobile station #A to subcarriers $f_1$, $f_4$, $f_7$, $f_{12}$, $f_{15}$, $f_{18}$, $f_{20}$, $f_{23}$ and $f_{26}$, SCCH #B for mobile station #B to subcarriers $f_2$, $f_5$, $f_8$, $f_{10}$, $f_{13}$, $f_{16}$, $f_{21}$, $f_{24}$, and $f_{27}$, and SCCH #C for mobile station #C to subcarriers $f_3$, $f_6$, $f_9$, $f_{11}$, $f_{14}$, $f_{17}$, $f_{19}$, $f_{22}$ and $f_{25}$. That is, according to the configuration of D-RBs, allocating section 102 cyclically shifts the allocation pattern of SCCH #A to SCCH #C in each subband in three subband cycles, makes the allocation pattern of SCCH #A to SCCH #C different in three subband cycles between the subbands, and allocate SCCH #A to SCCH #C to subcarriers $f_1$ to $f_{27}$.

By adopting such an allocation, the combination of a plurality of SCCHs is the same in all of D-RB 1 to D-RB 3 and L-RB 1 to L-RB 6, that is, the combination of SCCH #A, SCCH #B and SCCH #C. Consequently, even when D-RBs and L-RBs are frequency-domain-multiplexed and interference that data channels receive from SCCHs varies per subframe due to the influence of SCCH transmission power control, it is possible to evenly allocate the SCCHs for mobile stations to the RBs and prevent degradation of accuracy of data channel adaptive control.

SCCH ALLOCATION EXAMPLE 4 (FIG. 6)

This allocation example is a case where D-RBs and L-RBs are frequency-domain-multiplexed on a per subframe basis and the number of L-RBs is smaller than the number of D-RBs in one subframe. Further, as in allocation example 3, the present allocation example is a case where the number of SCCHs (here, three of SCCH #A, SCCH #B and SCCH #C) is the same as the number of D-RBs in one subband (here, three of D-RB 1, D-RB 2 and D-RB 3).

To be more specific, D-RB 1 is formed with subcarriers $f_1$, $f_{10}$, and $f_{19}$, D-RB 2 is formed with subcarriers $f_2$, $f_{11}$ and $f_{20}$, D-RB 3 is formed with subcarriers $f_3$, $f_{12}$ and $f_{21}$, D-RB 4 is formed with subcarriers $f_4$, $f_{13}$ and $f_{22}$, D-RB 5 is formed with subcarriers and $f_5$, $f_{14}$ and $f_{23}$, D-RB 6 is formed with subcarriers $f_6$, $f_{15}$ and $f_{24}$, and, L-RB 1 is formed with subcarriers $f_7$ to $f_9$, L-RB 2 is formed with subcarriers $f_{16}$ to $f_{18}$, and, L-RB 3 is formed with subcarriers $f_{25}$ to $f_{27}$.

In RB configuration as such, as in allocation example 3, allocating section 102 allocates SCCH #A for mobile station #A to subcarriers $f_1$, $f_4$, $f_7$, $f_{12}$, $f_{15}$, $f_{18}$, $f_{20}$, $f_{23}$ and $f_{26}$, SCCH #B for mobile station #B to subcarriers $f_2$, $f_5$, $f_8$, $f_{10}$, $f_{13}$, $f_{16}$, $f_{21}$, $f_{24}$, and $f_{27}$, and SCCH #C for mobile station #C to subcarriers $f_3$, $f_6$, $f_9$, $f_{11}$, $f_{14}$, $f_{17}$, $f_{19}$, $f_{22}$ and $f_{25}$. That is, according to the configuration of D-RBs, as in allocation example 3, allocating section 102 cyclically shifts in three subband cycles the allocation pattern of SCCH #A to SCCH #C in each subband, makes the allocation pattern of SCCH #A to SCCH #C different in three subband cycles between the subbands, and allocate SCCH #A to SCCH #C to subcarriers $f_1$ to $f_{27}$.

By adopting such an allocation, as in allocation example 3, the combination of a plurality of SCCHs is the same in all of D-RB 1 to D-RB 6 and L-RB 1 to L-RB 3, that is, the combination of SCCH #A, SCCH #B and SCCH #C. Consequently, even when D-RBs and L-RBs are frequency-domain-multiplexed and interference that data channels receive from SCCHs varies per subframe due to the influence of SCCH transmission power control, it is possible to evenly allocate the SCCHs for mobile stations to the RBs and prevent degradation of accuracy of data channel adaptive control.

Figure 5:
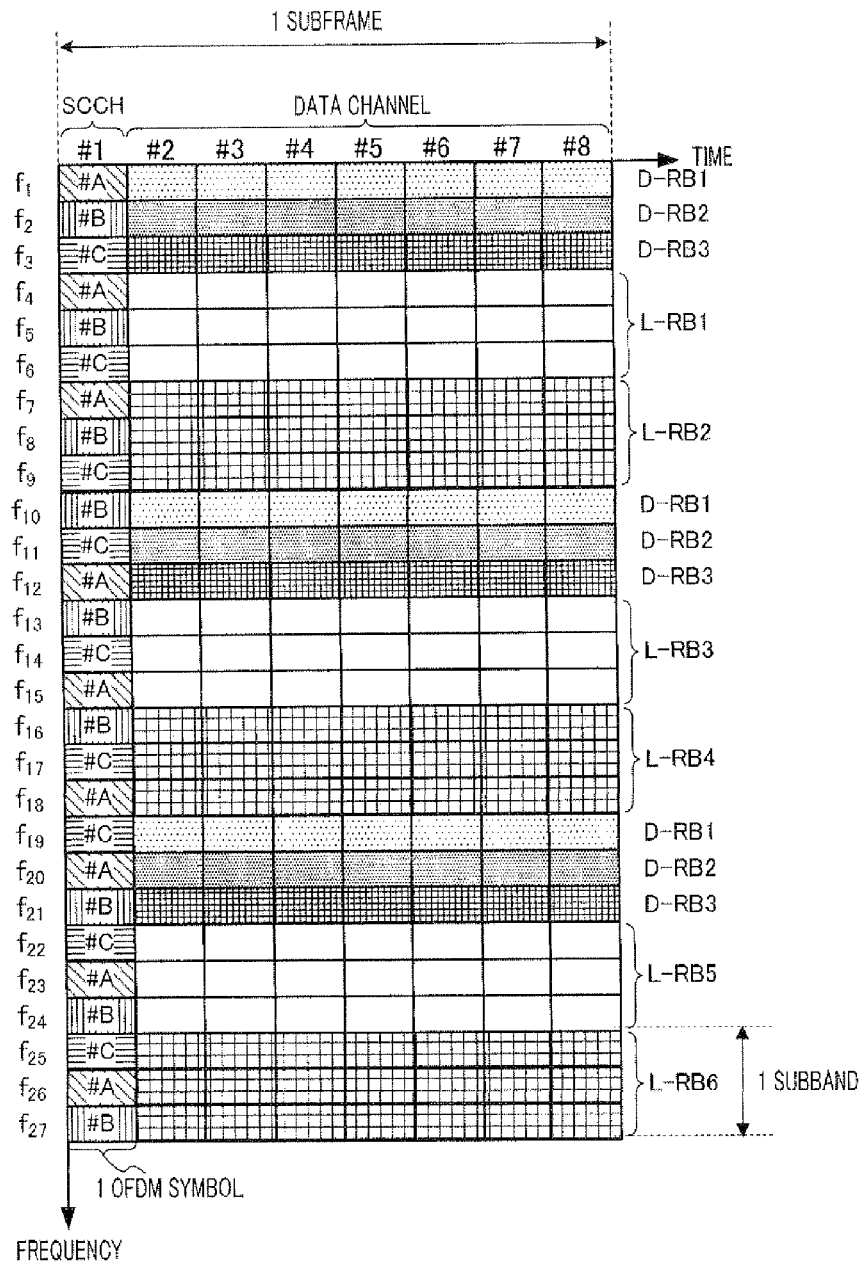
FIG. 5 is SCCH allocation example 3, according to the embodiment of the present invention.
Figure 6:
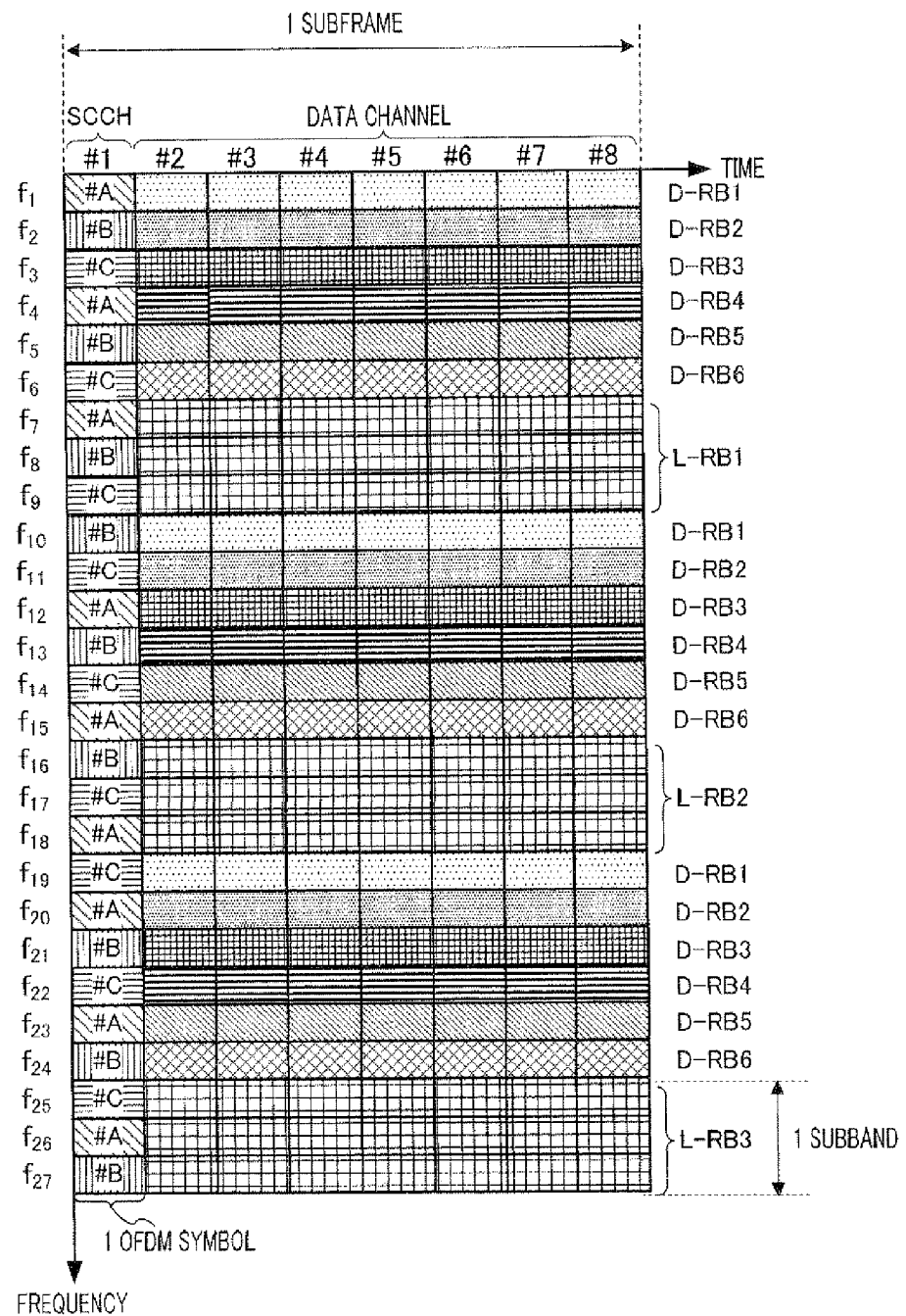
FIG. 6 is SCCH allocation example 4, according to the embodiment of the present invention.

Further, the SCCH allocation is the same between allocation example 3 (FIG. 5) and this allocation example (FIG. 6), so that, by adopting the SCCH allocations shown in FIGS. 5 and 6, it is possible to evenly allocate the SCCHs for mobile stations to RBs, regardless of a magnitude relationship of the numbers of D-RBs and L-RBs frequency-domain-multiplexed in each subframe.

SCCH ALLOCATION EXAMPLE 5 (FIG. 7)

It is possible to allocate a plurality of RBs for one mobile station using one SCCH, but, taking into ac count a delay requirement of transmitting data, it is preferable to use the SCCHs of a half to a quarter numbers of the total number of RBs. In this case, the number of SCCHs may be larger than the number of D-RBs in one subband.

Then, this allocation example will show a case where, in the RB configuration in which D-RBs and L-RBs are frequency-domain-multiplexed, the number of SCCHs (here, six of SCCH #A to SCCH #F) is larger than the number of D-RBs (here, three of D-RB 1 to D-RB 3) in one subband. Further, in this allocation example, the number of SCCHs is an integral multiple of the number of D-RBs in one subband.

Figure 7:
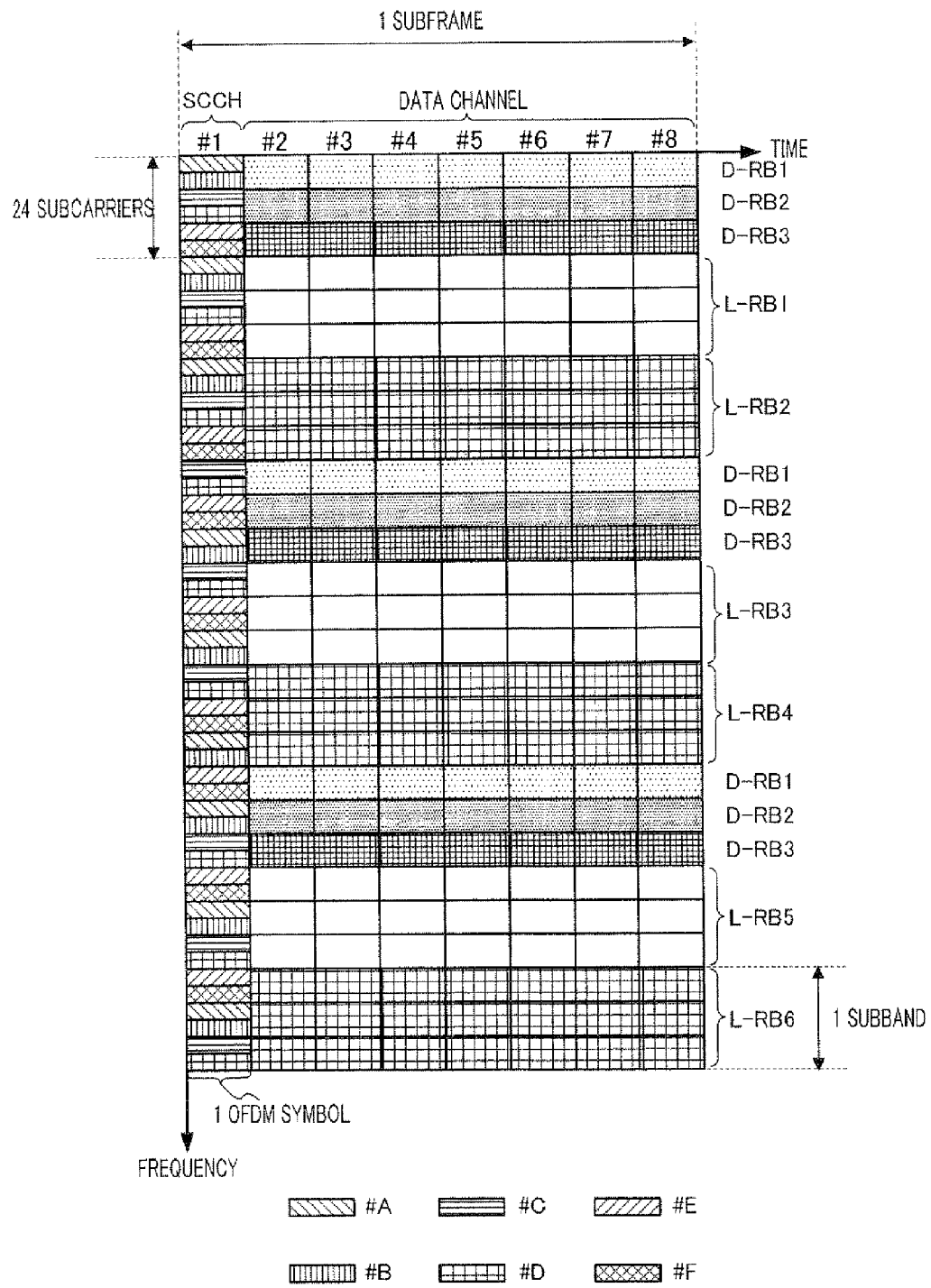
FIG. 7 is SCCH allocation example 5, according to the embodiment of the present invention.

In RB configuration as such, allocating section 102 allocates SCCH #A to SCCH #F of mobile stations #A to #F as shown in FIG. 7. That is, as in allocation example 3, according to the configuration of D-RBs, allocating section 102 cyclically shifts in three subband cycles the allocation pattern of SCCH #A to SCCH #F in each subband, makes the allocation pattern of SCCH #A to SCCH #F different in three subband cycles between the subbands, and allocate SCCH #A to SCCH #F to the subcarriers. In this allocation example, the order of SCCH #A to SCCH #F in each subband is cyclically shifted by two SCCHs in three subband cycles.

By adopting such an allocation, the combination of a plurality of SCCHs is the same in all of D-RB 1 to D-RB 3 and L-RB 1 to L-RB 6, that is, the combination of SCCH #A to SCCH #F. Consequently, even when D-RBs and L-RBs are frequency-domain-multiplexed and the number of D-RBs is larger than the number of L-RBs in one subframe and interference that data channels receive from SCCHs varies per subframe due to the influence of SCCH transmission power control, it is possible to evenly allocate the SCCHs for mobile stations to the RBs and prevent degradation of accuracy of data channel adaptive control.

SCCH ALLOCATION EXAMPLE 6 (FIG. 8)

This allocation example is a case where, in an RB configuration in which D-RBs and L-RBs are frequency-domain-multiplexed, the number of SCCHs (here, four of SCCH #A to SCCH #D) is larger than the number of D-RBs (here, three of D-RB 1 to D-RB 3) in one subband, as in allocation example 5. Further, in this allocation example, the number of SCCHs is not an integral multiple of the number of D-RBs in one subband.

Figure 8:
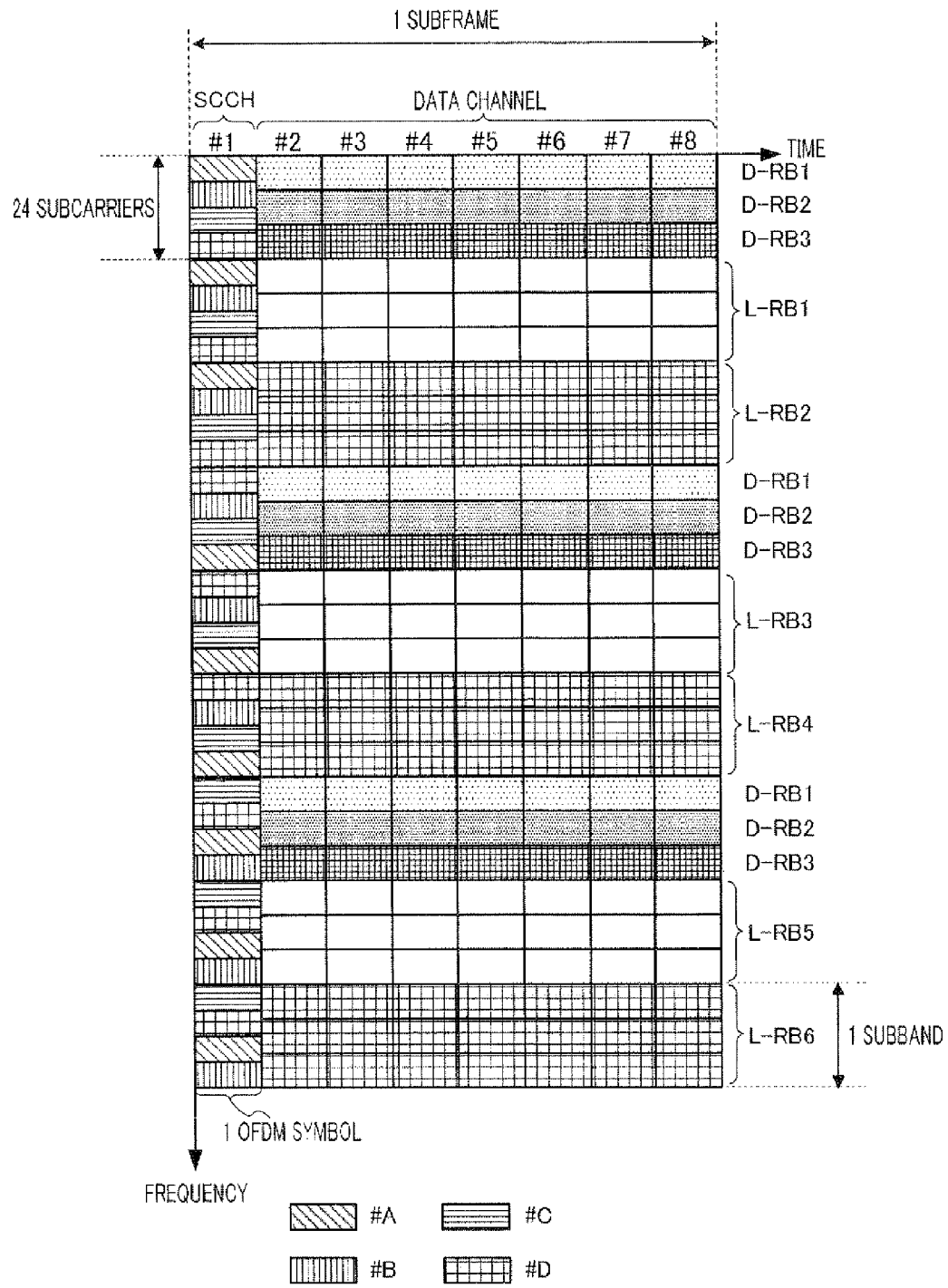
FIG. 8 is SCCH allocation example 6, according to the embodiment of the present invention.

In RB configuration as such, allocating section 102 allocates SCCH #A to SCCH #D of mobile stations #A to #D as shown in FIG. 8. That is, as in allocation example 3, according to the configuration of D-RBs allocating section 102 cyclically shifts in three subband cycles the allocation pattern of SCCH #A to SCCH #D in each subband, makes the allocation pattern of SCCH #A to SCCH #D different in three subband cycles between the subbands, and allocate SCCH #A to SCCH #D to the subcarriers. In this allocation example, the order of SCCH #A to SCCH #D in each subband is cyclically shifted by two SCCHs in three subband cycles.

By adopting such an allocation, the combination of a plurality of SCCHs is the same in all of D-RB 1 to D-RB 3 and L-RB 1 to L-RB 6, that is, the combination of SCCH #A to SCCH #D. Consequently, even when D-RBs and L-RBs are frequency-domain-multiplexed and the number of D-RBs is larger than the number of L-RBs in one subframe and interference that data channels receive from SCCHs varies per subframe due to the influence of SCCH transmission power control, it is possible to evenly allocate the SCCHs for mobile stations to the RBs and prevent degradation of accuracy of data channel adaptive control.

Further, as noted from allocation example 5 (FIG. 7) and this allocation example (FIG. 8), regardless of whether or not the number of SCCHs is an integral multiple of the number of D-RBs in one subband, it is possible to evenly allocate the SCCHs for mobile stations to RBs.

SCCH ALLOCATION EXAMPLE 7 (FIG. 9)

This allocation example makes the SCCH allocation patterns different between neighboring cells.

SCCH transmission power control is carried out based on received quality measured in the past subframes, and therefore, if the interference that SCCHs in one of neighboring cell receives from SCCHs in the other cell varies every subframe and received quality of the SCCHs in one of neighboring cell changes every subframe, upon transmission of control information in one of neighboring cell, transmission power control using current accurate received quality information cannot be carried out. That is, the accuracy of SCCH transmission power control is degraded. As a result, the SCCH error rate performances are degraded.

Figure 9:
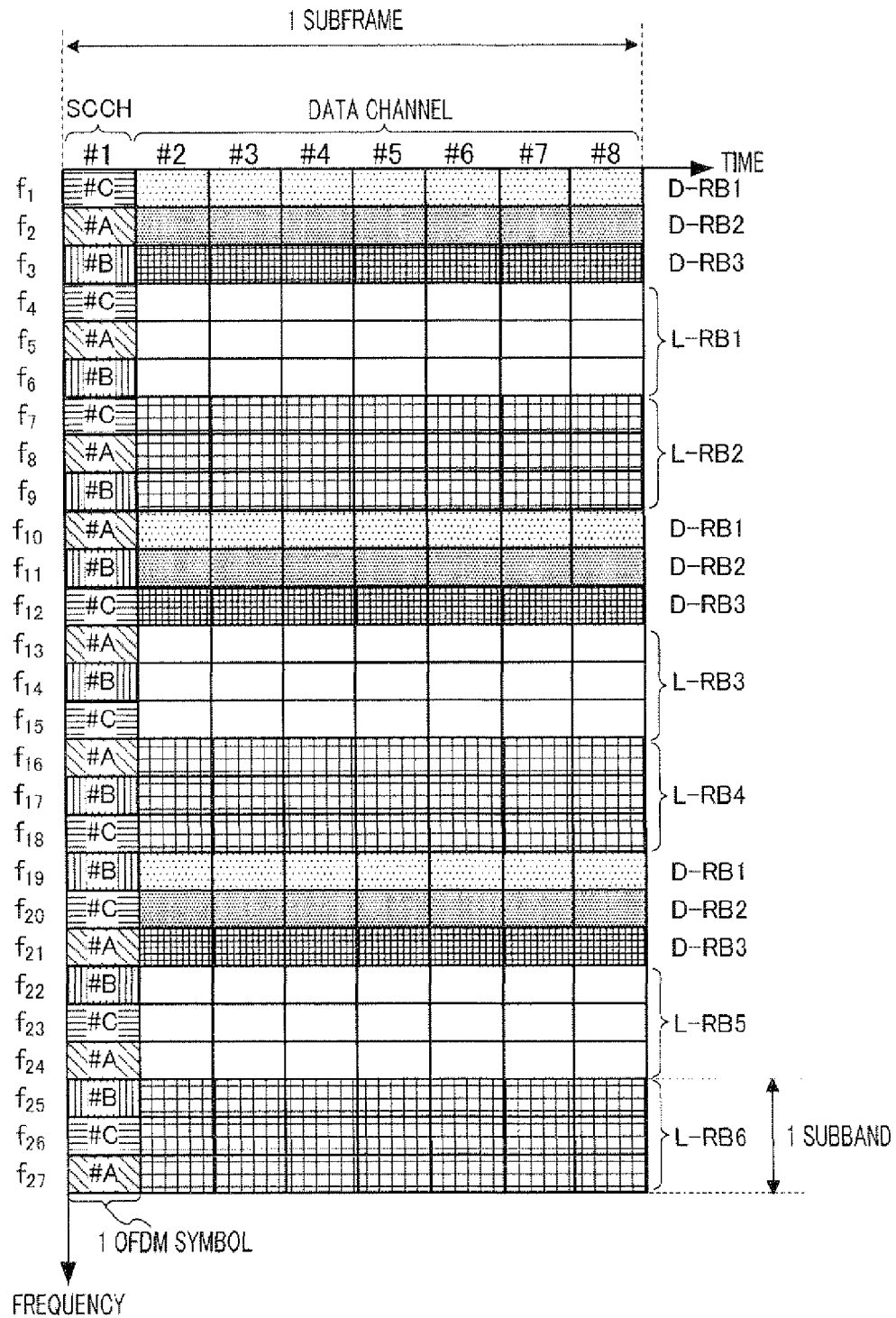
FIG. 9 is SCCH allocation example 7, according to the embodiment of the present invention.

Then, in this allocation example, assuming that cell 1 and cell 2 are neighboring each other and FIG. 5 shows the allocation patterns in cell 1, FIG. 9 shows the allocation patterns in cell 2. The allocation patterns shown in FIG. 9 also follow allocation example 3. However, the SCCHs allocated to the same subcarriers are different between the allocation patterns in FIG. 5 and the allocation patterns in FIG. 9.

In this way, by making the SCCH allocation patterns different between cell 1 and cell 2, in a case where SCCHs are transmitted at the same timing in cell 1 and cell 2, that is, in an inter-base station synchronization system where transmission timings of a plurality of base station are the same, it is possible to randomize interference between SCCHs in neighboring cells. Consequently, according to this allocation example, it is possible to prevent degradation of accuracy of SCCH transmission power control and prevent SCCH error rate performances from degrading. Further, in an inter-base station non-synchronization system, this allocation example provides the same effect as in allocation example 3.

Figure 10:
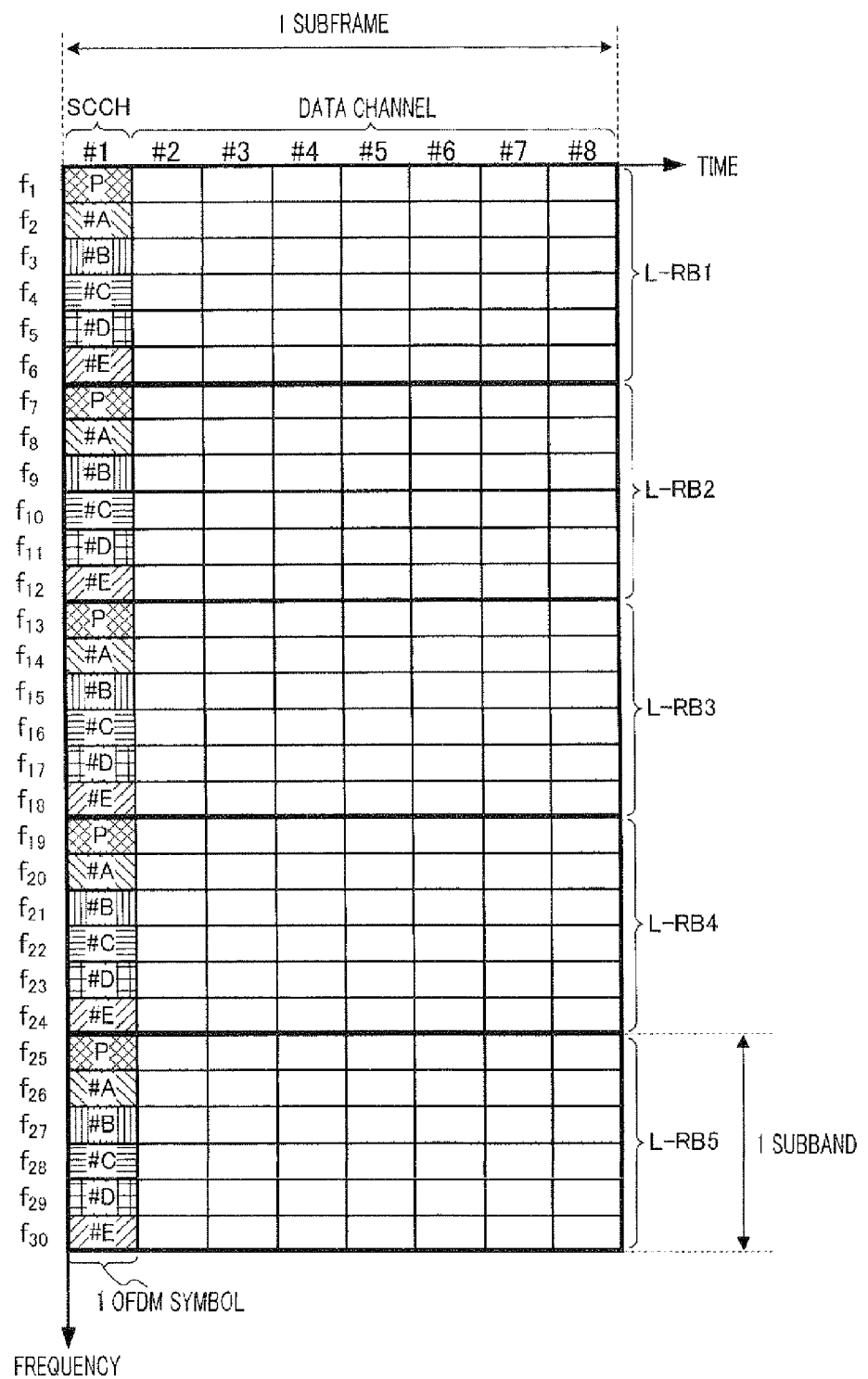
FIG. 10 is SCCH allocation example 8 (cell 1), according to the embodiment of the present invention.
Figure 11:
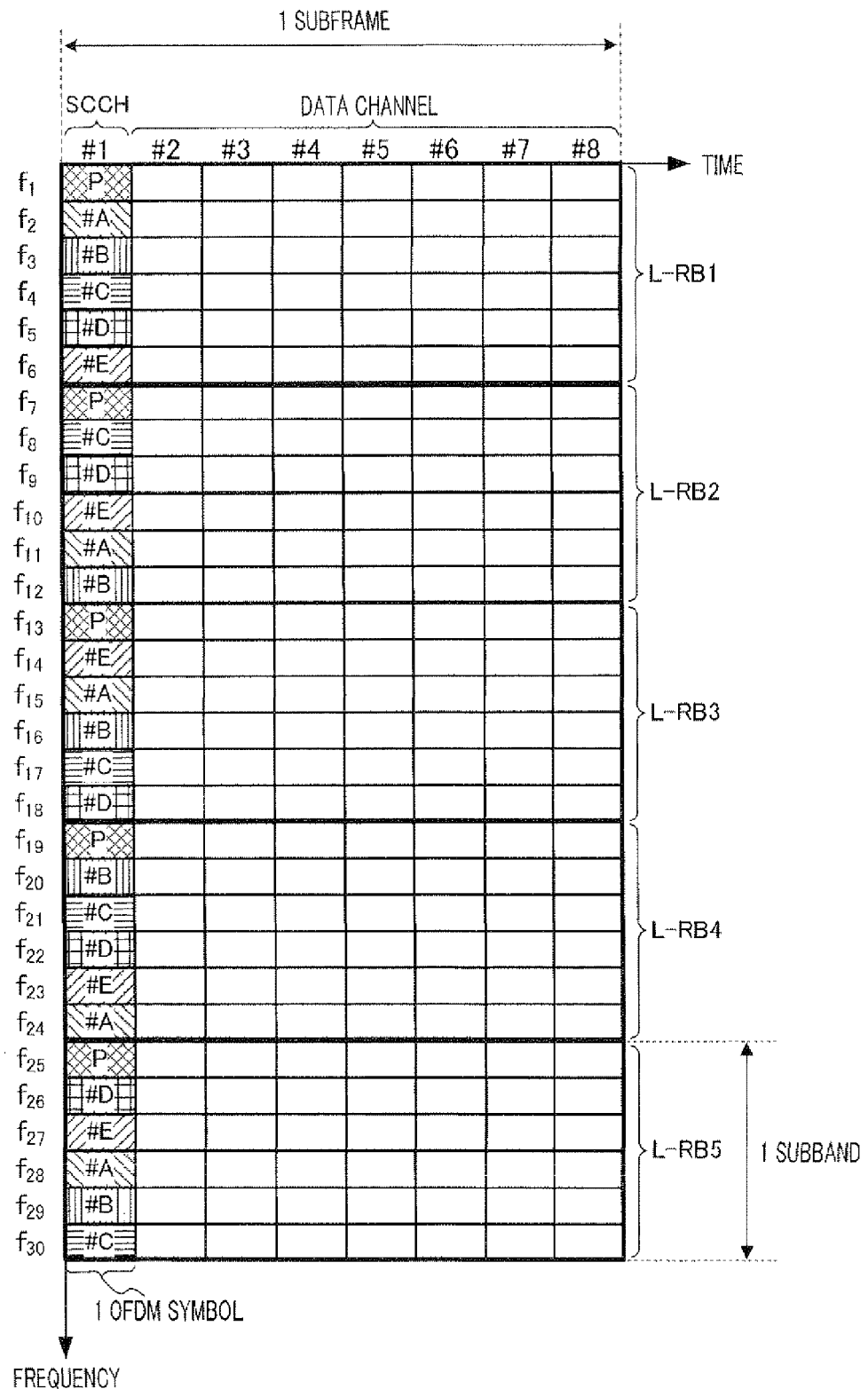
FIG. 11 is SCCH allocation example 8 (cell 2), according to the embodiment of the present invention.

SCCH ALLOCATION EXAMPLE 8 (FIGS. 10 and 11)

The present allocation example is a case where a data channel in each subframe is formed with L-RBs alone and the SCCH allocation patterns per L-RB are made different between neighboring cells. To be more specific, L-RB 1 is formed with subcarriers $f_1$ to $f_6$, L-RB 2 is formed with subcarriers $f_7$ to $f_{12}$, L-RB 3 is formed with subcarriers $f_{13}$ to $f_{18}$, L-RB 4 is formed with subcarriers $f_{19}$ to $f_{24}$, and L-RB 5 is formed with subcarriers $f_{25}$ to $f_{30}$.

In all the following allocation examples, pilot symbol P is multiplexed at the beginning of the subframe at six-subcarrier intervals.

In the case of adopting the RB configuration, for example, in the case where cell 1 and cell 2 are neighboring each other, FIG. 10 shows the allocation patterns in cell 1 and FIG. 11 shows the allocation patterns in cell 2.

That is, as shown in FIG. 10, when pilot symbol P is allocated to subcarriers $f_1$, $f_7$, $f_{13}$, $f_{19}$ and $f_{25}$, allocating section 102 of base station 100 in cell 1 allocates SCCH #A for mobile station #A to subcarriers $f_2$, $f_8$, $f_{14}$, $f_{20}$ and $f_{26}$, SCCH #B for mobile station #B to subcarriers $f_3$, $f_9$, $f_{15}$, $f_{21}$ and $f_{27}$, SCCH #C for mobile station #C to subcarriers $f_4$, $f_{10}$, $f_{16}$, $f_{22}$ and $f_{28}$, SCCH #D for mobile station #D to subcarriers $f_5$, $f_{11}$, $f_{17}$, $f_{23}$ and $f_{29}$ and, SCCH #E for mobile station #E to subcarriers $f_6$, $f_{12}$, $f_{18}$, $f_{24}$ and $f_{30}$. In this way, In cell 1, the allocation patterns per L-RB are the same in L-RB 1 to L-RB 5.

Meanwhile, as shown in FIG. 11, when pilot symbol P is allocated to subcarriers $f_1$, $f_7$, $f_{13}$, $f_{19}$ and $f_{25}$, allocating section 102 of base station 100 in cell 2 allocates SCCH #A for mobile station #A to subcarriers $f_2$, $f_{11}$, $f_{15}$, $f_{24}$ and $f_{28}$, SCCH #B for mobile station #B to subcarriers $f_3$, $f_{12}$, $f_{16}$, $f_{20}$, and $f_{29}$, SCCH #C for mobile station #C to subcarriers $f_4$, $f_8$, $f_{17}$, $f_{21}$ and $f_{30}$, SCCH #D for mobile station #D to subcarriers $f_5$, $f_9$, $f_{18}$, $f_{22}$ and $f_{26}$, and, SCCH #E for mobile station #E to subcarriers $f_6$, $f_{10}$, $f_{14}$, $f_{23}$ and $f_{27}$. In this way, in cell 2, the allocation pattern of SCCH #A to SCCH #E in L-RB 1 is the same as in cell 1 and the allocation pattern of SCCH #A to SCCH #E in L-RB 1 is cyclically shifted by two subcarriers every L-RB, and therefore the allocations of SCCH #A to SCCH #E are made different between the L-RBs That is, according to this allocation example, SCCH #A of cell 2 receives interference from SCCH #A of cell 1 in L-RB 1, receives interference from SCCH #D of cell 1 in L-RB 2, receives interference from SCCH #B of cell 1 in L-RB 3, receives interference from SCCH #E of cell 1 in L-RB 4, and receives interference from SCCH #C of cell 1 in L-RB 5. That is, SCCH #A of cell 2 receives interference from SCCH #A to SCCH #E of cell 1.

Similarly, SCCH #B of cell 2 receives interference from SCCH #B of cell 1 in L-RB 1, receives interference from SCCH #E of cell 1 in L-RE 2, receives interference from SCCH #C of cell 1 in L-RB 3, receives interference from SCCH #A of cell 1 in L-RB 4, and receives interference from SCCH #D of cell 1 in L-RB 5. That is, SCCH #5 of cell 2 also receives interference from SCCH #A to SCCH #E in cell 1.

The same applies to the interference SCCH #C to SCCH #5 of cell 2 and SCCH #A to SCCH 45 of cell 1 receive.

That is, according to this allocation example, in an inter-base station synchronization system, only if the SCCH transmission power of SCCH #A to SCCH #E of cells 1 and 2 individually vary, it is possible to make interference uniform between SCCHs in neighboring cells. Consequently, according to this allocation example, it is possible to prevent degradation of accuracy of SCCH transmission power control and prevent SCCH error rate performances from degrading.

Further, according to this allocation example, the combination of the SCCHs is the same in all of L-RB 1 to L-RB 5 and the SCCHs for mobile stations are evenly allocated to RBs, so that, in an inter-base station non-synchronization system, this allocation example provides the same effect as in allocation example 1.

In cell 2, by cyclically shifting every L-RE the allocation pattern of SCCH #A to SCCH #E in L-RB 1, the allocations of SCCH #A to SCCH #E are made different between the L-RBs. However, the allocations of SCCH #A to SCCH #E between L-RBs may be made different by an allocation method that does not rely upon the cyclic shift, and the above-described correspondence may be applicable to the SCCHs between neighboring cells.

Figure 12:
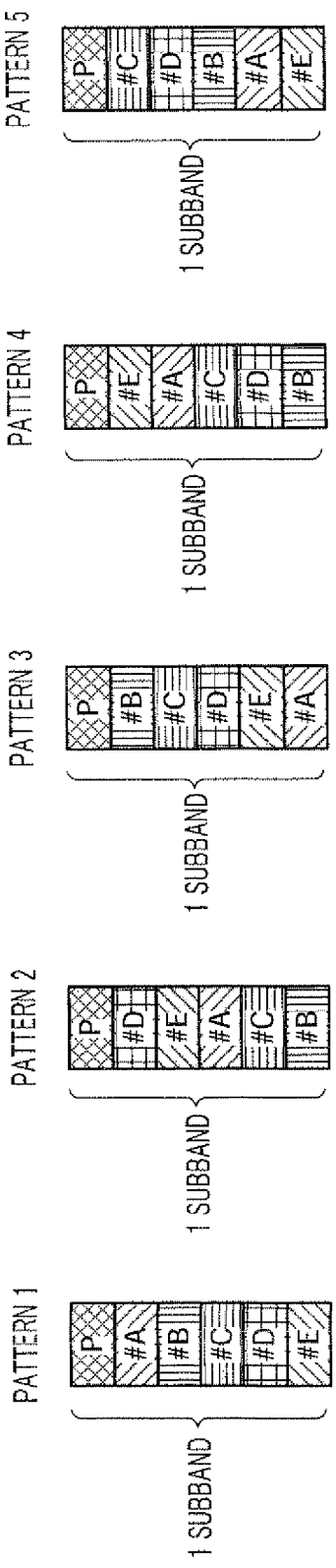
FIG. 12 is allocation patterns 1 to 5 in SCCH allocation example 9, according to the embodiment of the present invention.
Figure 13:
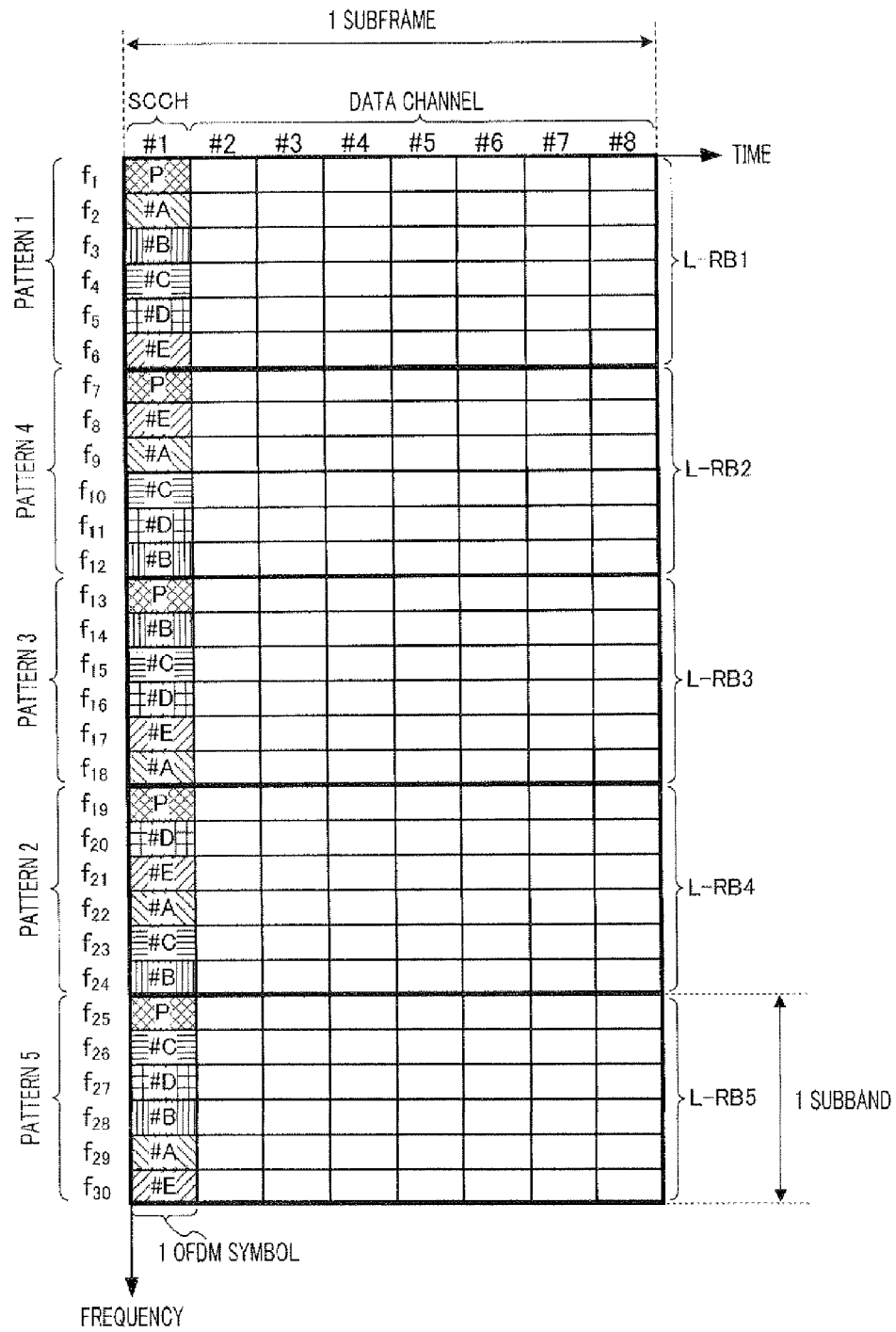
FIG. 13 is SCCH allocation example 9 (cell 1), according to the embodiment of the present invention.
Figure 14:
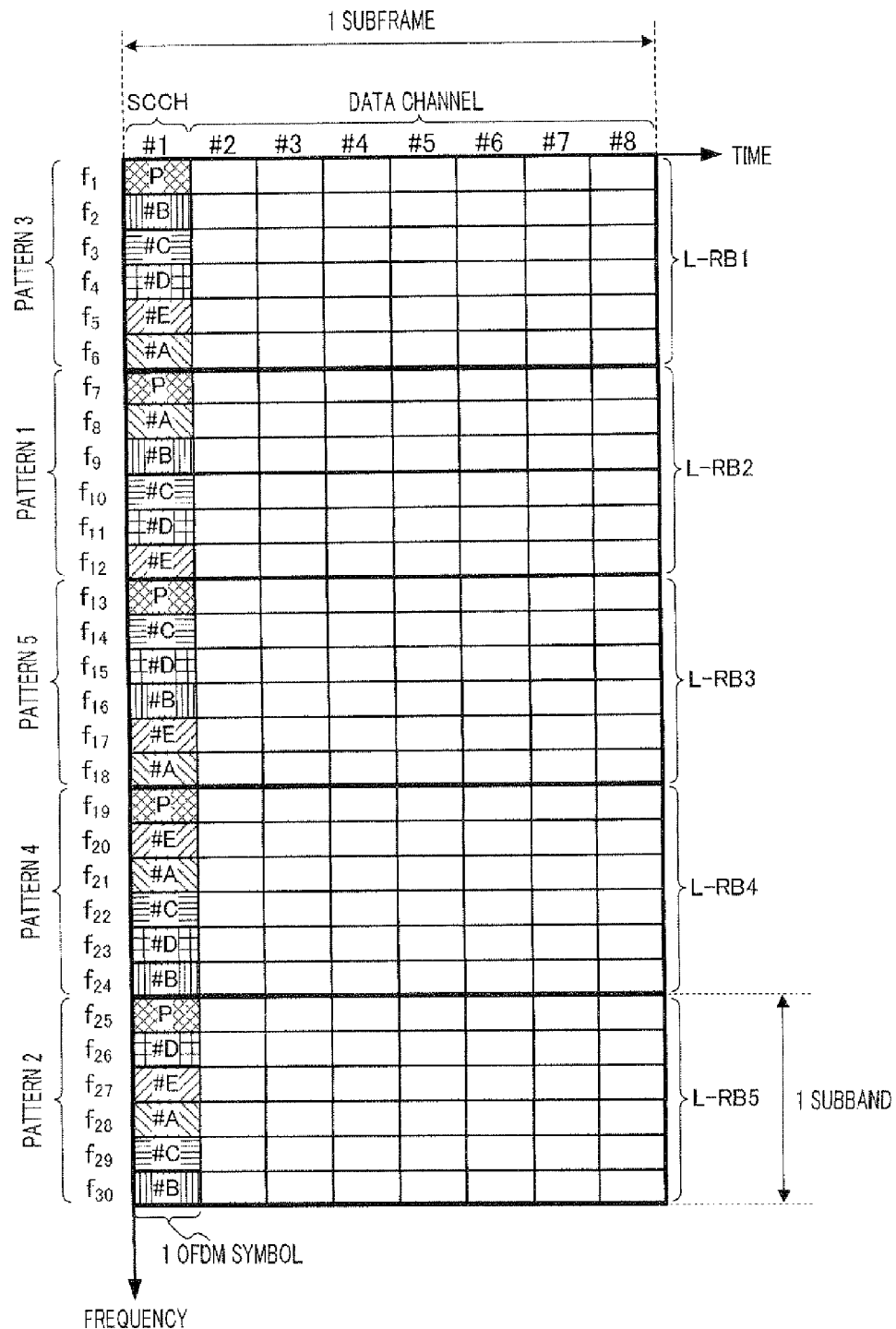
FIG. 14 is SCCH allocation example 9 (cell 2), according to the embodiment of the present invention.

SCCH ALLOCATION EXAMPLE 9 (FIGS. 12, 13 and 14)

This allocation example differs in allocation example 8 in selecting an allocation pattern of the SCCHs per L-RB from a plurality of predetermined allocation patterns.

That is, in this allocation example, an allocation pattern of the SCCHs per L-RB is selected from patterns 1 to 5 shown in FIG. 12. Patterns 1 to 5 are the allocation patterns on a per subband basis.

For example, as shown in FIG. 13, allocating section 102 of base station 100 in cell 1 selects and allocates pattern 1 to L-RB 1, pattern 4 to L-RB 2, pattern 3 to L-RB 3, pattern 2 to L-RB 4, and pattern 5 to L-RB 5. By this means, in cell 1, when pilot symbol P is allocated to subcarriers $f_1$, $f_7$, $f_{13}$, $f_{19}$ and $f_{25}$, allocating section 102 allocates SCCH #A for mobile station #A to subcarriers $f_2$, $f_9$, $f_{18}$, $f_{22}$ and $f_{29}$, SCCH #B for mobile station #B to subcarriers $f_3$, $f_{12}$, $f_{14}$ $f_{24}$ and $f_{28}$, SCCH #C for mobile station #C to subcarriers $f_4$, $f_{10}$, $f_{15}$, $f_{23}$ and $f_{26}$, SCCH #D for mobile station #D to subcarriers $f_5$, $f_{11}$, $f_{16}$, $f_{20}$ and $f_{27}$, and, SCCH #E for mobile station #E to subcarriers $f_6$, $f_8$, $f_{17}$, $f_{21}$ and $f_{30}$.

Meanwhile, as shown in FIG. 14, allocating section 102 of base station 100 in cell 2 selects and allocates pattern 3 to L-RB 1, pattern 1 to L-RB 2, pattern 5 to L-RB 3, pattern 4 to L-RB 4, and pattern 2 to L-RB 5. By this means, in cell 2, when pilot symbol P is allocated to subcarriers $f_1$, $f_7$, $f_{13}$, $f_{19}$ and $f_{25}$, allocating section 102 allocates SCCH #A for mobile station #A to subcarriers $f_6$, $f_8$, $f_{18}$, $f_{21}$ and $f_{28}$, SCCH #B for mobile station #B to subcarriers $f_2$, $f_9$, $f_{16}$, $f_{24}$ and $f_{30}$, SCCH #C for mobile station #C to subcarriers $f_3$, $f_{10}$, $f_{14}$, $f_{22}$ and $f_{29}$, SCCH #D for mobile station #D to subcarriers $f_4$, $f_{11}$, $f_{15}$, $f_{23}$ and $f_{26}$, and, SCCH #E for mobile station #E to subcarriers $f_5$, $f_{12}$, $f_{17}$, $f_{20}$ and $f_{27}$.

In this way, ac cording to this allocation example, the SCCH allocation patterns selected for the same L-RB are made different between cell 1 and cell 2. That is, according to this allocation example, in an inter-base station synchronization system, it is possible to randomize interference between SCCHs in neighboring cells. Consequently, according to this allocation example, it is possible to prevent degradation of accuracy of SCCH transmission power control and prevent SCCH error rate performances from degrading.

Further, in this allocation example, the selectable allocation patterns per L-RB are predetermined as patterns 1 to 5 shown in FIG. 12, so that just a simple process of selecting one of patterns 1 to 5 and allocating the selected pattern to L-RBs, makes it possible to randomize interference between SCCHs in neighboring cells.

Further, in this allocation example, the combination of SCCHs is the same in all of patterns 1 to 5 shown in FIG. 12 and the SCCHs of mobile stations are evenly allocated to L-RBs, so that, in an inter-base station non-synchronization system, this allocation example provides the same effect as in allocation example 1.

In this allocation example, to further randomize, by changing the correspondence relationships between L-RB 1 to L-RB 5 and patterns 1 to 5 on a per subframe basis, the allocation patterns for the L-RBs may vary every subframe.

Figure 15:
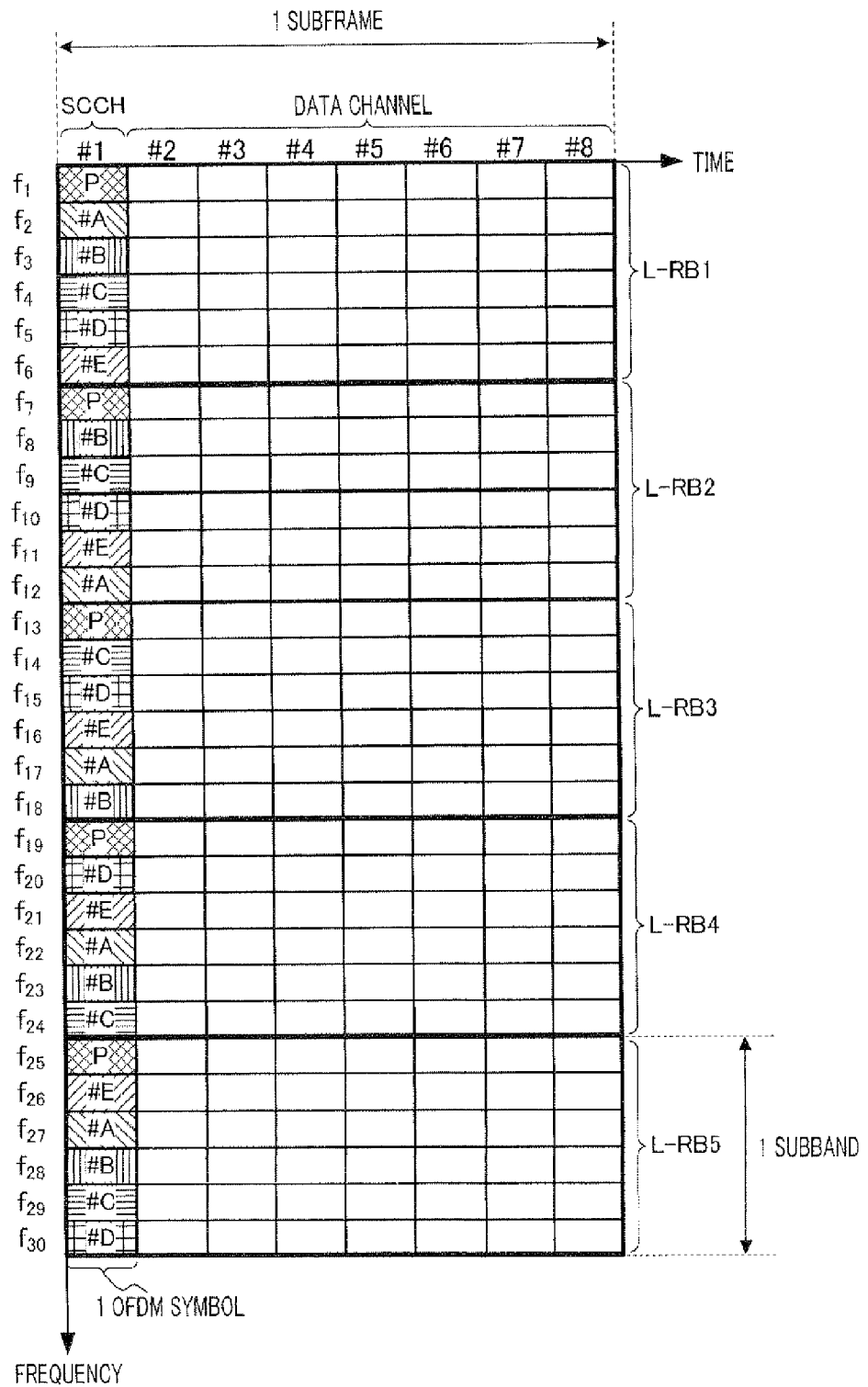
FIG. 15 is SCCH allocation example 10 (cell 1), according to the embodiment of the present invention.
Figure 16:
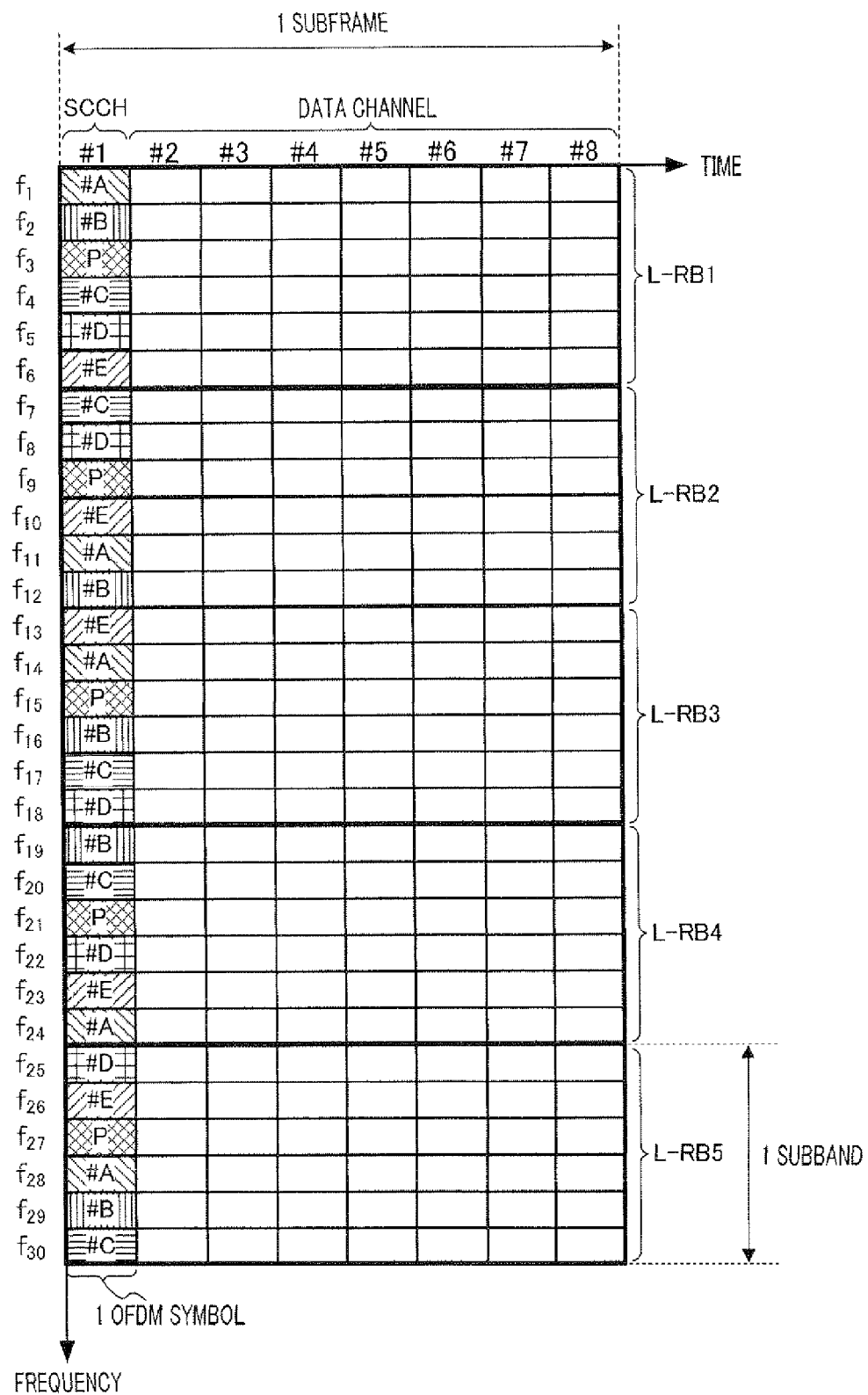
FIG. 16 is SCCH allocation example 10 (cell 2), according to the embodiment of the present invention.

SCCH ALLOCATION EXAMPLE 10 (FIGS. 15 and 16)

This allocation example differs in allocation example 8 in that subcarriers where pilot symbol P is allocated are different between neighboring cells.

To be more specific, pilot symbol P of cell 1 is allocated to subcarriers $f_1$, $f_7$, $f_{13}$, $f_{19}$ and $f_{25}$ as shown in FIG. 15. In contrast, pilot symbol P of cell 2 is allocated to subcarriers $f_3$, $f_9$, $f_{15}$, $f_{21}$ and $f_{27}$ as shown in FIG. 16.

Then, as shown in FIG. 15, allocating section 102 of base station 100 in cell 1 allocates SCCH #A for mobile station #A to subcarriers $f_2$, $f_{12}$, $f_{17}$, $f_{22}$ and $f_{27}$, SCCH #B for mobile station #B to subcarriers $f_3$, $f_8$, $f_{18}$, $f_{23}$ and $f_{28}$, SCCH #C for mobile station #C to subcarriers $f_4$, $f_9$, $f_{14}$, $f_{24}$ and $f_{29}$, SCCH #D for mobile station #D to subcarriers $f_5$, $f_{10}$, $f_{15}$, $f_{20}$ and $f_{30}$, SCCH #E for mobile station #E to subcarriers $f_6$, $f_{11}$, $f_{16}$, $f_{21}$ and $f_{26}$. As such, in cell 1, by cyclically shifting the allocation patterns of SCCH #A to SCCH #E of L-RB 1 by one subcarrier, the allocations of SCCH #A to SCCH #E are made different between the L-RBs.

Meanwhile as shown in FIG. 16, allocating section 102 of base station 100 in cell 2 allocates SCCH #A for mobile station #A to subcarriers $f_1, f_{11}, f_{14}, f_{24}$ and $f_{28}$, SCCH #B for mobile station #B to subcarriers $f_2, f_{12}, f_{16}, f_{19}$ and $f_{29}$, SCCH #C for mobile station #C to subcarriers $f_4, f_7, f_{17}, f_{20}$ and $f_{30}$, SCCH #D for mobile station #D to subcarriers $f_5, f_8, f_{18}, f_{22}$ and $f_{25}$, SCCH #E for mobile station #E to subcarriers $f_6, f_{10}, f_{13}, f_{23}$ and $f_{26}$. As such, in cell 2, by cyclically shifting the allocation patterns of SCCH #A to SCCH #E of L-RB 1 by two subcarriers, the allocations of SCCH #A to SCCH #E are made different between the L-RBs.

In this way, according to this allocation example, the allocation patterns of SCCHs per L-RB are different between neighboring cells, so that, in an inter-base station synchronization system, it is possible to randomize interference between SCCHs in neighboring cells. Consequently, according to this allocation example, it is possible to prevent accuracy of SCCH transmission power control from degrading and prevent SCCH error rate performances from degrading.

Further, according to this allocation example, pilot symbol P of cell 1 receives interference from SCCH #A of cell 2 in L-RB 1, receives interference from SCCH #C of cell 2 L-RB 2, receives interference from SCCH #E of cell 2 in L-RB 3, receives interference from SCCH #B of cell 2 in L-RB 4, and receives interference from SCCH #D of cell 2 in L-RB 5. That is, pilot symbol P of cell 1 receives interference from SCCH #A to SCCH #E of cell 2.

Similarly, pilot symbol P of cell 2 receives interference from SCCH #B of cell 2 in L-RB 1, receives interference from SCCH #C of cell 2 in L-RB 2, receives interference from SCCH #D of cell 2 in L-RB 3, receives interference from SCCH #E of cell 2 in L-RB 4, and receives interference from SCCH #A of cell 2 in L-RB 5. That is pilot symbol P of cell 2 also receives interference from SCCH #A to SCCH #E of cell 1.

That is, according to this allocation example, in an inter-base station synchronization system, only if the SCCH transmission power of SCCH #A to SCCH #E of cells 1 and 2 vary individually, it is possible to make uniform both interference that the pilot symbol in cell 1 receives from the SCCHs in cell 2 and interference that the pilot symbol in cell 2 receives from the SCCHs in cell 1. Pilot symbols are used for channel estimation of SCCHs and data channels, and measurement of received quality at a mobile station and so on, so that, by making interference pilot symbols receive uniform, it is possible to even out reception performance of SCCHs and data channels and improve accuracy of SCCH transmission power control and data channel adaptive control.

Further, there are cases where pilot symbols are transmitted with high transmission power for improved received quality. In this allocation example, in cell 1, SCCH #B in L-RB 1, SCCH #C in L-RB 2, SCCH #D in L-RB 3, SCCH #E in L-RB 4, and SCCH #A in L-RB 5 receive interference from pilot symbol P of cell 2, and, in cell 2, SCCH #A in L-RB 1, SCCH #C in L-RB 2, SCCH #E in L-RB 3, SCCH #B in L-RB 4, and SCCH #D in L-RB 5 receive interference from pilot symbol P of cell 1. That is, according to this allocation example, interference that one SCCH receives from pilot symbols in a neighboring cell is made uniform, so that it is possible to further improve SCCH error rate performances than in allocation example 8.

Further, according to this allocation example, the combination of SCCHs is the same in all of L-RB 1 to L-RB 5 and the SCCHs for mobile stations are evenly allocated to the RBs, so that, in an inter-base station non-synchronization system, this allocation example provides the same effect as in allocation example 1.

Further, in this allocation example, the allocation of SCCH #A to SCCH #E is made different between L-RBs by cyclically shifting the allocation pattern of SCCH #A to SCCH #E in L-RB 1 every L-RB. However, the allocation of SCCH #A to SCCH #E between the L-RBs may be made different by an allocation method that does not rely upon the cyclic shift, and the above-described correspondence may be applicable to pilot symbols P and the SCCHs between neighboring cells.

Figure 17:
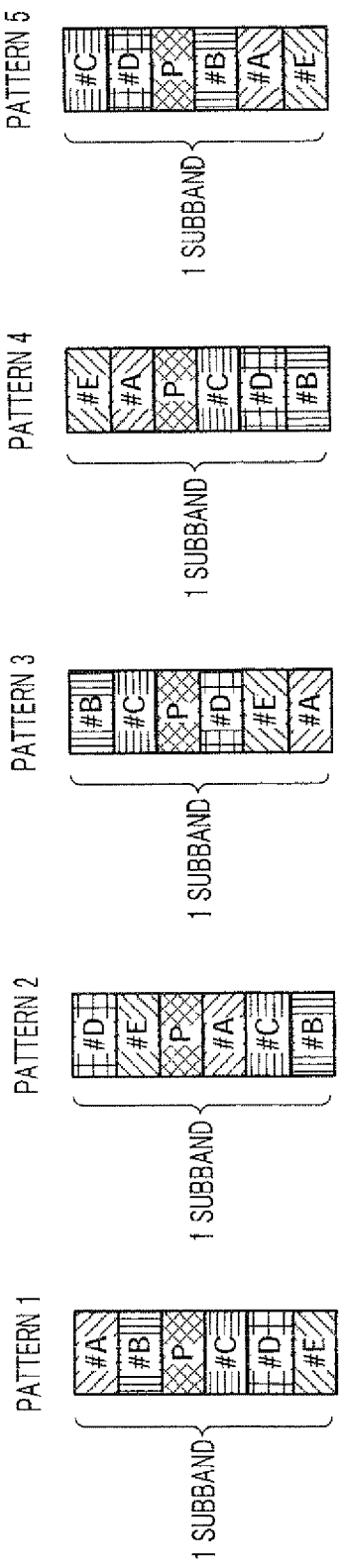
FIG. 17 is allocation patterns 1 to 5 in SCCH allocation example 11, according to the embodiment of the present invention.
Figure 18:
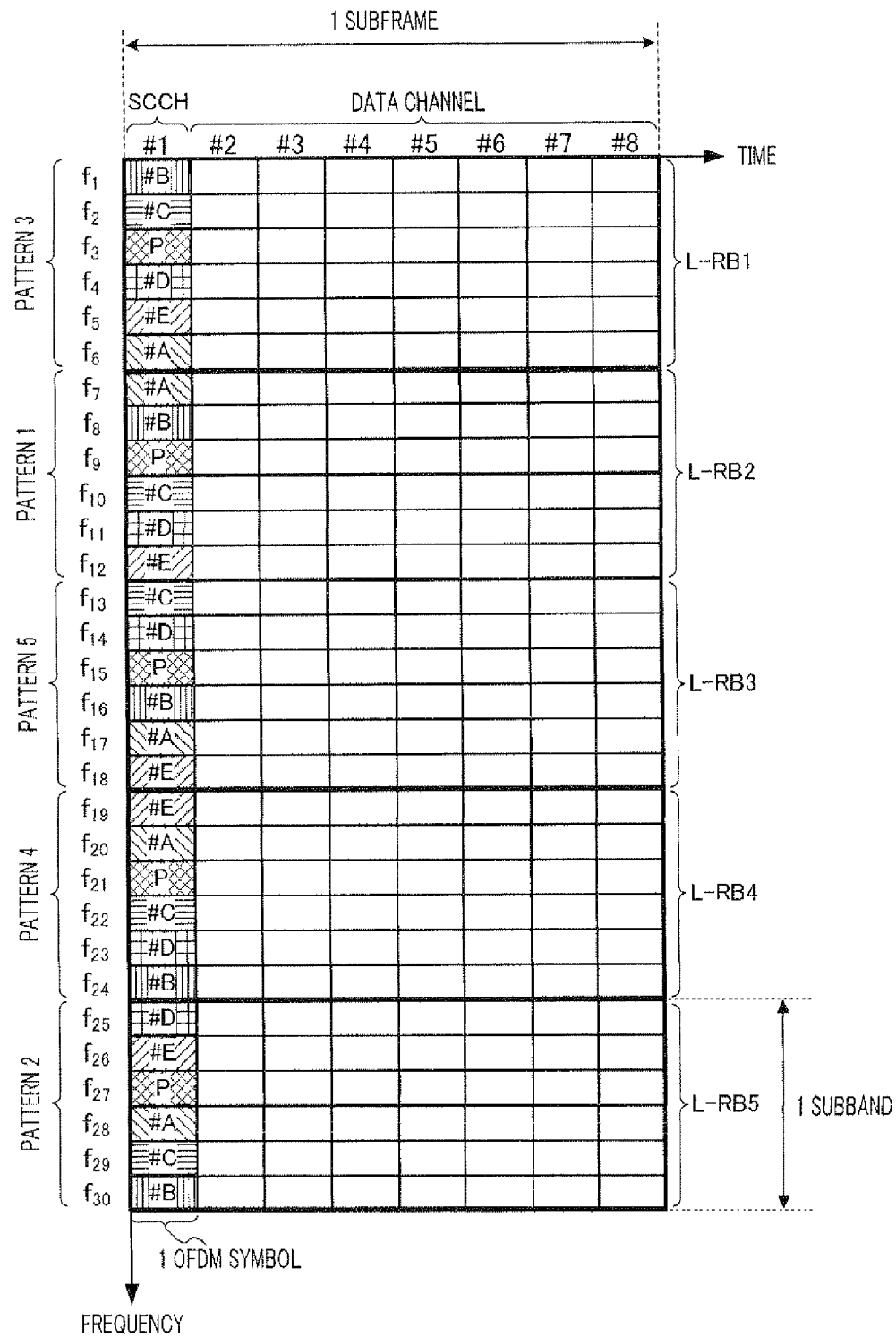
FIG. 18 is SCCH allocation example 11 (cell 2), according to the embodiment of the present invention.

SCCH ALLOCATION EXAMPLE 11 (FIGS. 17 and 18)

This allocation example differs in allocation example 10 in selecting allocation patterns of SCCHs per L-RB from a plurality of predetermined allocation patterns.

That is, in this allocation example, an allocation pattern of the SCCHs per L-RB in cell 1 is selected from patterns 1 to 5 shown in FIG. 12, and an allocation pattern of the SCCHs per L-RB in cell 2 is selected from patterns 1 to 5 shown in FIG. 17. Patterns 1 to 5 are the allocation patterns on a per subband basis.

Assuming that the allocation patterns in cell 1 are as shown in FIG. 13, allocating section 102 of base station 100 in cell 2 selects and allocates pattern 3 to L-RB 1, pattern 1 to L-RB 2, pattern 5 to L-RB 3, pattern 4 to L-RB 4, and pattern 2 to L-RB 5 as shown in FIG. 18. By this means, in cell 2, when pilot symbol P is allocated to subcarriers $f_3, f_9, f_{15}, f_{21}$ and $f_{27}$, allocating section 102 allocates SCCH #A for mobile station #A to subcarriers $f_6, f_7, f_{17}, f_{20}$ and $f_{28}$, SCCH #B for mobile station #B to subcarriers $f_1, f_8, f_{16}, f_{24}$ and $f_{30}$, SCCH #C for mobile station #C to subcarriers $f_2, f_{10}, f_{13}, f_{22}$ and $f_{29}$, SCCH #D for mobile station #D to subcarriers $f_4, f_{11}, f_{14}, f_{23}$ and $f_{25}$, and, SCCH #E for mobile station #E to subcarriers $f_5, f_{12}, f_{18}, f_{19}$ and $f_{26}$.

As such, according to this allocation example, selectable allocation patterns per L-RB in cell 1 are predetermined as patterns 1 to 5 shown in FIG. 12 and selectable allocation patterns per L-RB in cell 2 are predetermined as patterns 1 to 5 shown in FIG. 17, so that just a simple process of selecting one of patterns 1 to 5 and allocating the selected pattern to the L-RBs per cell, makes it possible to randomize interference between SCCHs in neighboring cells, even when subcarriers where pilot symbol P is allocated are different between neighboring cells.

Further, in this allocation example, the combination of SCCHs is the same in all of patterns 1 to 5 shown in FIG. 12 and in all of patterns 1 to 5 shown in FIG. 17, and the SCCHs for mobile stations are evenly allocated to the L-RBs, so that, in an inter-base station synchronization system, this allocation example provides the same effect as in allocation example 1.

In this allocation example, to further randomize, by changing the correspondence relationships between L-RB 1 to L-RB 5 and patterns 1 to 5 on a per subframe basis, the allocation patterns for the L-RBs may vary every subframe.

Figure 19:
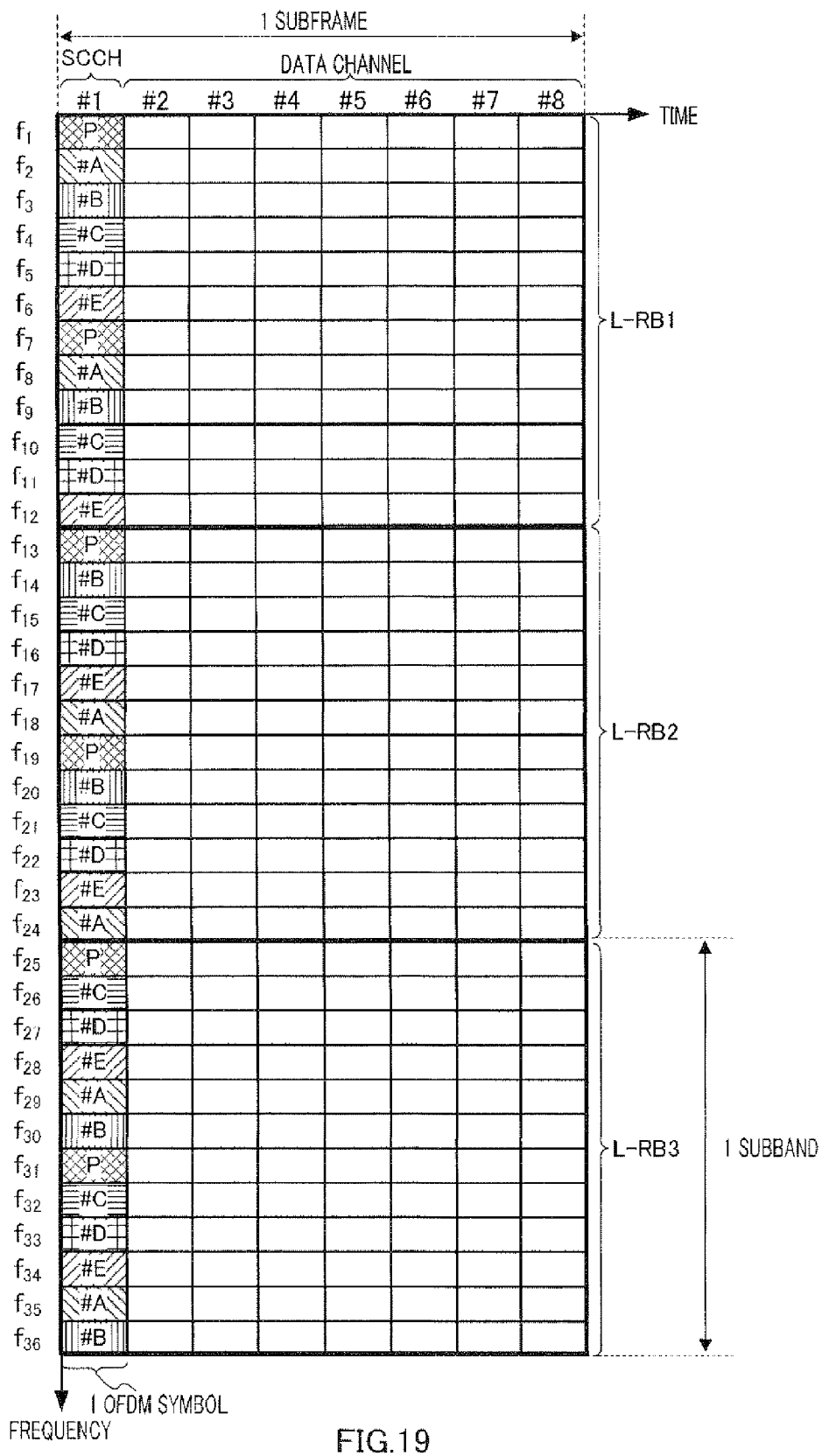
FIG. 19 is SCCH allocation example 12 (cell 1), according to the embodiment of the present invention.
Figure 20:
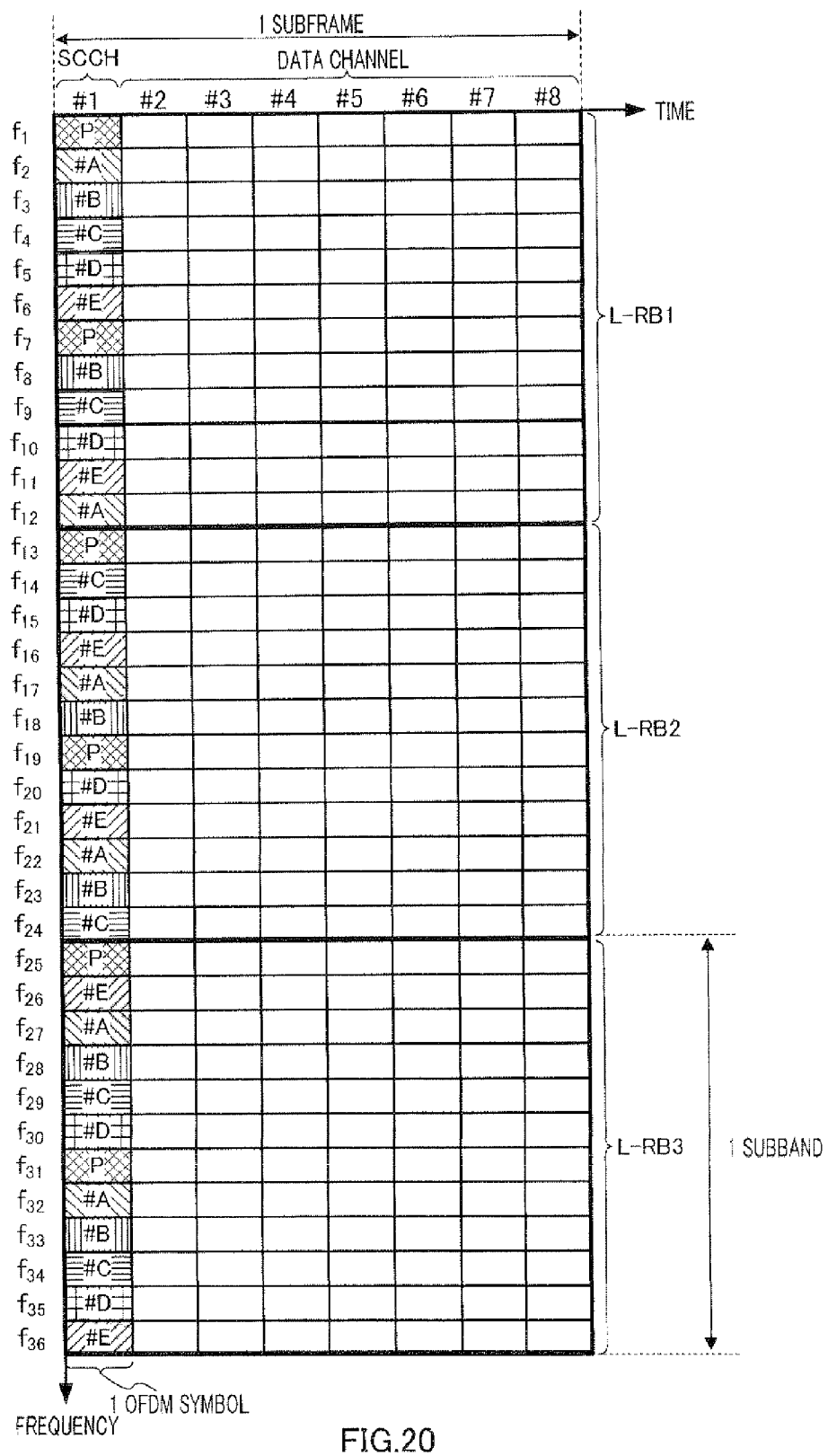
FIG. 20 is SCCH allocation example 12 (cell 2), according to the embodiment of the present invention.

SCCH ALLOCATION EXAMPLE 12 (FIGS. 19 and 20)

This allocation example is where the number of subcarriers in one L-RB does not match the pilot symbol intervals.

To be more specific, as shown in FIGS. 19 and 20, assuming that the number of subcarriers in one L-RB is twelve and the pilot symbol interval is six subcarriers, in this allocation example, FIG. 19 shows the allocation patterns in cell 1 and FIG. 20 shows the allocation patterns in cell 2. That is, in this allocation example, there are two subcarriers forming one SCCH in one L-RB.

In this way, according to this allocation example, the allocation patterns of the SCCHs per L-RB are different between neighboring cells, so that, in an inter-base station synchronization system, it is possible to randomize interference between SCCHs in neighboring cells. Consequently, according to this allocation example, even when the number of subcarriers in one L-RB does not match pilot symbol intervals, it is possible to prevent degradation of accuracy of SCCH transmission power control and prevent SCCH error rate performances from degrading.

Further, according to this allocation example, the combination of SCCHs is the same in all of L-RB 1 to L-RB 3 and the SCCHs for mobile stations are evenly allocated to the RBs, so that, in an inter-base station non-synchronization system, this allocation example provides the same effect as in allocation example 1.

Further, in this allocation example, the allocation patterns vary every L-RB in cell 1 as shown in FIG. 19. In contrast, the allocation patterns vary between blocks of the pilot symbol interval in cell 2 as shown in FIG. 20. This makes it possible to further randomize interference between SCCHs in neighboring cells.

It is equally possible to change the allocation patterns every L-RB in both cell 1 and cell 2, and change the allocation patterns between blocks of the pilot symbol interval in both cell 1 and cell 2. By changing the allocation patterns between blocks of the pilot symbol interval in both cell 1 and cell 2, it is possible to further reduce interference given to pilot symbol P from neighboring cells.

SCCH ALLOCATION EXAMPLE 13 (FIG. 21)

This allocation example is where the number of SCCHs transmitted is larger than the number of SCCHs allocatable in one L-RB, such as the number of SCCHs is larger than the number of subcarriers in one L-RB.

Figure 21:
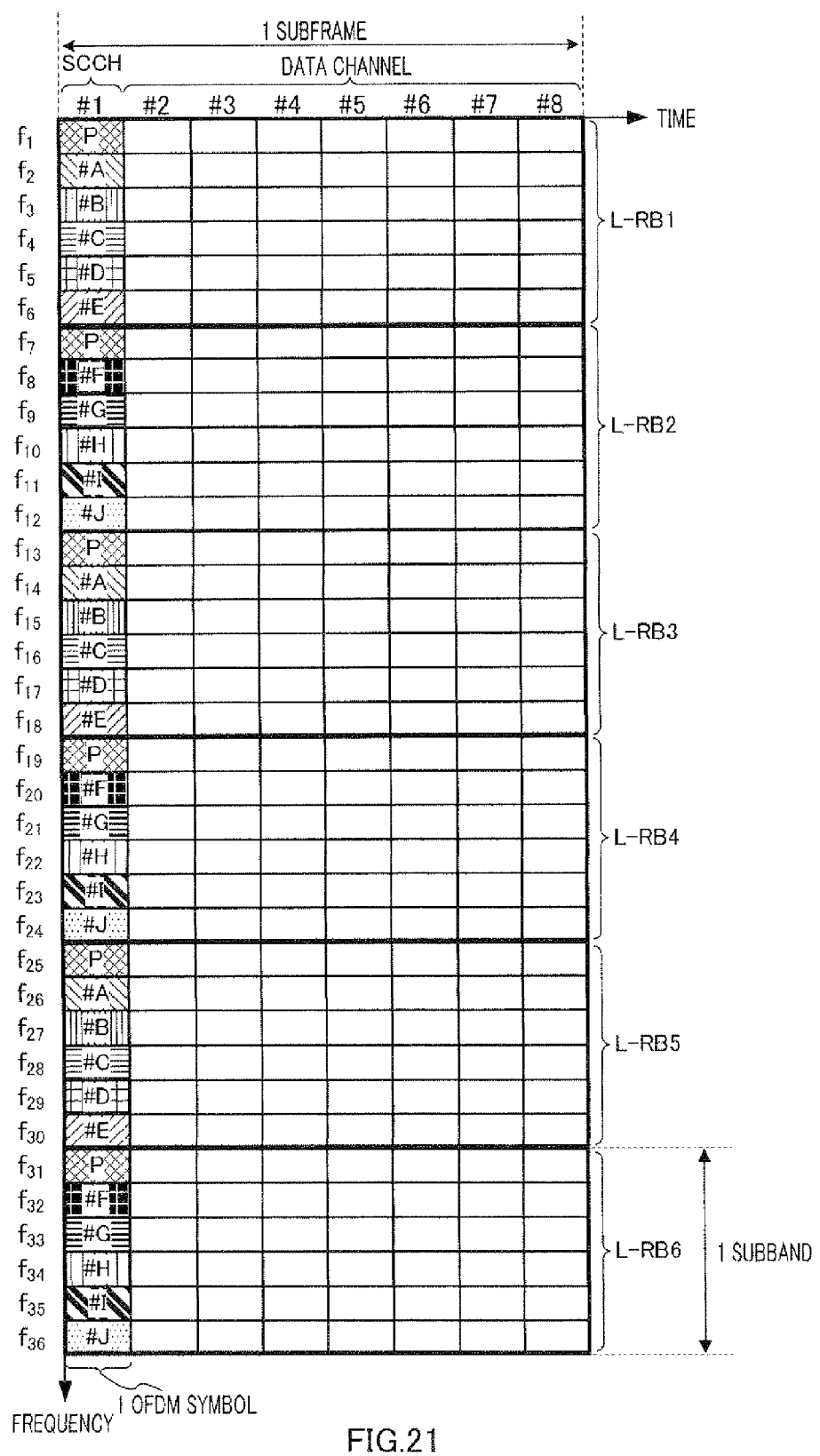
FIG. 21 is SCCH allocation example 13, according to the embodiment of the present invention.

To be more specific, as shown in FIG. 21, assuming that the number of SCCHs is ten of SCCH #A to SCCH #J, and the number of subcarriers in one L-RB is five, in this allocation example, SCCH #A to SCCH #E are allocated to odd-numbered L-RBs, L-RB 1, L-RB 3 and L-RB 5, and SCCH #F to SCCH #J are even-numbered L-RBs, L-RB 2, L-RB 4 and L-RB 6. By this means, the allocation pattern in the block formed with L-RB 1 and L-RB 2, the allocation pattern in the block formed with L-RB 3 and L-RB 4 and the allocation pattern in the block formed with L-RB 5 and L-RB 6 can be the same.

In this way, according to this allocation example, the combinations of SCCHs is the same every two L-RBs and the SCCHs for mobile stations are evenly allocated every two L-RBs, so that, even when the number of SCCHs is larger than the number of subcarriers in one L-RB in base station in an inter-base station non-synchronization system, allocation example provides the same effect as in allocation example 1.

Further, by making the allocation patterns of SCCHs per L-RB different between neighboring cells, even when the number of SCCHs is larger than the number of subcarriers per L-RB in an inter-base station synchronization system, it is possible to randomize interference between SCCHs in neighboring cells, so that it is possible to prevent degradation of accuracy of SCCH transmission power control and prevent SCCH error rate performances from degrading.

In the odd-numbered L-RBs (i.e. the L-RBs where SCCH #A to SCCH #E are allocated) and the odd-numbered L-RBs (i.e. the L-RBs where SCCH #F to SCCH #J are allocated), the SCCH allocation patterns may be made different between neighboring cells as in allocation example 8. This provides the same effect as in allocation example 8.

In the odd-numbered L-RBs (i.e. the L-RBs where SCCH #A to SCCH #E are allocated) and the odd-numbered L-RBs (i.e. the L-RBs where SCCH #F to SCCH #J are allocated), allocation patterns of SCCHs may be selected as in allocation example 9. This provides the same effect as in allocation example 9.

An embodiment of the present invention has been explained.

Although cases have been explained with the above allocation examples where the SCCHs are evenly allocated to the RBs perfectly, the same effect may be provided if the SCCHs are evenly allocated to the RBs approximately.

The subframes used with the above explanation may be other transmission time units including time slots and frames.

The RBs used with the above explanation may be other transmission units in the frequency domain including subcarrier blocks.

Further, a mobile station may be referred to as "UE," base station may be referred to as "Node-B," and a subcarrier may be referred to as "tone." Further, a subband may be referred to as a "subchannel", a "subcarrier block," or a "chunk." Further, a CP may be referred to as a "guard interval (GI)." Further, an SCCH may be referred to as a "PDCCH (Physical Downlink Control Channel) or a "CCE (Control Channel Element)." Further, a pilot symbol may be referred to as a "reference signal." Further, a resource unit formed with one subcarrier and one OFDM symbol may be referred to as a "RE (Resource Element)." Further, a subband may be referred to as a "physical resource block (P-RB)" or simply a "resource block (RE)."

Further, in the SCCH, uplink channel allocation information and control signals such as an Ack or a Nack besides a mobile station ID, an RB number, MCS information may be transmitted.

Further, although the SCCH has been explained with the above explanation as an example of channels where transmission power control is carried out per mobile station, the present invention is not limited to this, and, the present invention is applicable to all channels where transmission power control is carried out per r mobile station.

Further, although control information for one mobile station is transmitted in one SCCH in the above explanation, a plurality of mobile stations may be grouped and one SCCH is used per group. The transmission power control in this case is carried out according to the mobile station of the lowest received quality in the group.

Further, although an example has been explained with the above explanation, where the SCCH is allocated at the beginning of the subframe, the SCCH may be allocated to the position that is not the beginning of the subframe, for example, the second OFDM symbol of the subframe. Furthermore, the SCCH may be allocated to a plurality of OFDM symbols.

Further, although an example has been explained with the above explanation where the SCCHs and data channels are time-domain-multiplexed, the SCCHs and data channels may also be frequency-domain-multiplexed.

Further, although the transmission power control is carried out after the SCCHs are allocated to the subcarriers in the above explanation, the SCCHs may also be allocated to subcarriers after the transmission power control for the SCCHs is carried out. That is, in FIG. 1, the position of allocating section 102 and transmission power control section 103 may be switched and transmission power control section 103 is set upstream of allocating section 102.

Further, in 3GPP LTE (long term evolution), bandwidths in the system are set every resource block, so that, by determining the SCCH allocation patterns every resource block as in the above allocation examples, it is possible to manage various bandwidths in the system flexibly.

Further, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSIs, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSIs as a result of the advancement of semiconductor technology or a derivative other technology, it is naturally also possible to carry out function block integration using this technology. Application of biotechnology is also possible.

The disclosure of Japanese Patent Application No. 2006-223583, filed on Aug. 18, 2006, and Japanese Patent Application No. 2007-104209, filed on Apr. 11, 2007, including the specifications, drawings and abstracts, are incorporated herein by reference in their entirety.

Industrial Applicability

The present invention is applicable to, for example, mobile station communication systems.

The invention claimed is:

1. A radio communication base station apparatus comprising:
    an allocating section that allocates at least one of a plurality of blocks to a communication party, a plurality of subcarriers being divided into the plurality of blocks; and
    a mapping section that maps data to the at least one of the plurality of blocks, and maps a plurality of control channels, which are respectively addressed to different communication parties, with a sequence in which the plurality of control channels are arranged and which is cyclically shifted depending on a cell to a frequency domain in units of the blocks.

2. The radio communication base station apparatus according to claim 1, further comprising a control section that controls transmission power of each of the plurality of control channels such that total transmission power of the plurality of control channels is fixed.

3. The radio communication base station apparatus according to claim 1, wherein
    the mapping section maps the plurality of control channels such that a sequence of the plurality of control channels is different between the plurality of blocks.

4. The radio communication base station apparatus according to claim 1, wherein the mapping section maps the plurality of control channels such that a sequence of the plurality of control channels is different between cells.

5. The radio communication base station apparatus according to claim 1, wherein the mapping section maps the plurality of control channels to a symbol other than a first symbol in a subframe.

6. The radio communication base station apparatus according to claim 1, wherein the mapping section frequency-multiplexes the data with the plurality of control channels.

7. The radio communication base station apparatus according to claim 1, wherein the mapping section maps the plurality of control channels to a part of the plurality of blocks.

8. The radio communication base station apparatus according to claim 1, wherein the mapping section maps the plurality of control channels to a Localized Resource Block or a Distributed Resource Block.

9. The radio communication base station apparatus according to claim 1, wherein the mapping section maps the plurality of control channels such that each of the plurality of control channels is uniformly mapped to the plurality of blocks forming the frequency domain in the units of the blocks.

10. The radio communication base station apparatus according to claim 1, wherein the mapping section maps the plurality of control channels such that a combination of the plurality of control channels which are mapped to two of the plurality of blocks is the same between the two of the plurality of blocks.

11. The radio communication base station apparatus according to claim 1, wherein each of the plurality of control channels carries control information including at least of an ID of the communication party, a number of blocks that are allocated, and information of a modulation and coding scheme.

12. A control channel mapping method comprising:
    allocating, at a radio communication apparatus, at least one of a plurality of blocks to a communication party, a plurality of subcarriers being divided into the plurality of blocks;
    mapping data to the at least one of the plurality of blocks; and
    mapping a plurality of control channels, which are respectively addressed to different communication parties, with a sequence in which the plurality of control channels are arranged and which is cyclically shifted depending on a cell to a frequency domain in units of the blocks.

* * * * *